United States Patent
Kotake et al.

(10) Patent No.: US 10,979,694 B2
(45) Date of Patent: Apr. 13, 2021

(54) INFORMATION PROCESSING APPARATUS, METHOD, AND STORAGE MEDIUM

(71) Applicant: CANON KABUSHIKI KAISHA, Tokyo (JP)

(72) Inventors: Daisuke Kotake, Yokohama (JP); Masakazu Tohara, Komae (JP); Hiroshi Yoshikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 16/050,979

(22) Filed: Jul. 31, 2018

(65) Prior Publication Data
US 2018/0338135 A1   Nov. 22, 2018

Related U.S. Application Data

(63) Continuation of application No. 14/531,829, filed on Nov. 3, 2014, now Pat. No. 10,070,117.

(30) Foreign Application Priority Data

Nov. 5, 2013 (JP) ................. 2013-229804
Sep. 2, 2014 (JP) ................. 2014-178560

(51) Int. Cl.
*H04N 13/246* (2018.01)
*G01B 5/00* (2006.01)
(Continued)

(52) U.S. Cl.
CPC ......... *H04N 13/246* (2018.05); *G01B 5/0014* (2013.01); *G01B 11/2513* (2013.01); *H04N 13/254* (2018.05)

(58) Field of Classification Search
CPC .. H04N 13/246; H04N 13/254; G01B 5/0014; G01B 11/2513
See application file for complete search history.

(56) References Cited

U.S. PATENT DOCUMENTS 8,862,002 B2 * 10/2014 Igarashi ............ G03G 15/0189
                                                    399/49
9,307,912 B2 *  4/2016 Mullin ................... G01J 5/0011
(Continued)

FOREIGN PATENT DOCUMENTS

| JP | 2002-135765 A | 5/2002 |
| JP | 2012-147281 A | 8/2012 |
| WO | 2012/026180 A1 | 3/2012 |

OTHER PUBLICATIONS

D. Joseph and S. Collins, "Temperature Dependence of Fixed Pattern Noise in Logarithmic CMOS Image Sensors", IEEE Transactions on Instrumentation and Measurement, vol. 58, No. 8, Aug. 2009 (Year: 2009).*

(Continued)

*Primary Examiner* — Alexander Satanovsky
*Assistant Examiner* — Douglas Kay
(74) *Attorney, Agent, or Firm* — Canon U.S.A., Inc. IP Division

(57) ABSTRACT

To perform a high-accuracy three-dimensional measurement by performing an appropriate calibration in accordance with various temperature changes, an information processing apparatus that decides a temperature-dependent parameter of a projection apparatus configured to project a pattern onto a measurement target object to perform a three-dimensional measurement includes a holding unit configured to hold a relationship in which the temperature-dependent parameter of the projection apparatus is set as a temperature function, a temperature input unit configured to input a temperature of the projection apparatus, and a temperature-dependent parameter decision unit configured to decide the temperature-dependent parameter of the projection apparatus based on the temperature of the projection apparatus which is input by the temperature input unit and the relationship.

14 Claims, 9 Drawing Sheets

(51) Int. Cl.
*G01B 11/25* (2006.01)
*H04N 13/254* (2018.01)

(56) References Cited

U.S. PATENT DOCUMENTS

| | | |
|---|---|---|
| 9,413,988 B2 | 8/2016 | Heinke et al. |
| 2013/0064580 A1* | 3/2013 | Igarashi ............ G03G 15/0189 399/301 |
| 2013/0116573 A1 | 5/2013 | Herman |
| 2014/0046192 A1* | 2/2014 | Mullin .................. H05K 13/00 600/474 |

OTHER PUBLICATIONS

H. Handel, "Compensation of thermal errors in vision based measurement systems using a system identification approach", ICSP2008 Proceedings (Year: 2008).*

* cited by examiner

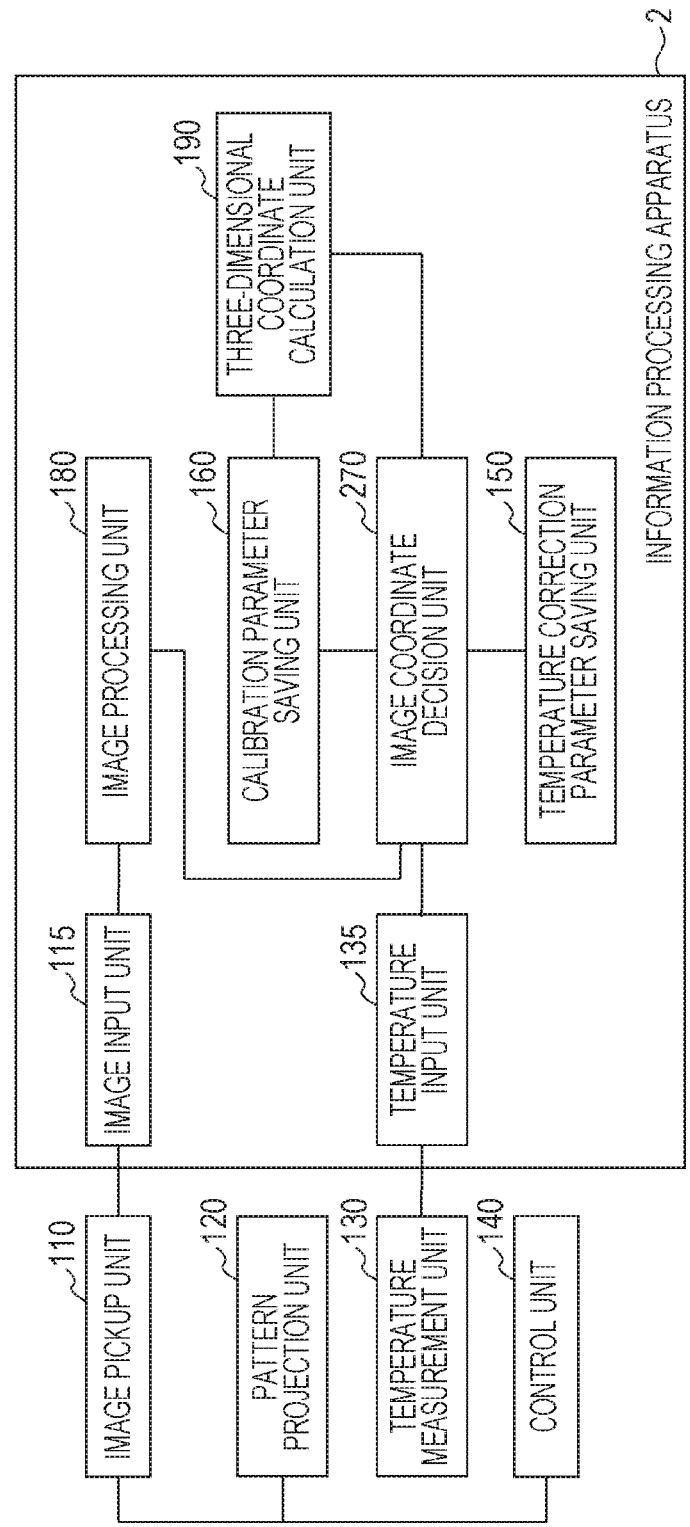

INFORMATION PROCESSING APPARATUS, METHOD, AND STORAGE MEDIUM

CROSS-REFERENCE TO RELATED APPLICATIONS

This application is a Continuation of U.S. application Ser. No. 14/531,829, filed Nov. 3, 2014, which claims the benefit of priority from Japanese Patent Application No. 2013-229804, filed Nov. 5, 2013, and Japanese Patent Application No. 2014-178560 filed Sep. 2, 2014, each of which is hereby incorporated by reference herein in their entirety.

BACKGROUND OF THE INVENTION

Field of the Invention

The present disclosure generally relates to information processing and, more particularly, to an information processing apparatus, method, and storage medium configured to perform a three-dimensional measurement.

Description of the Related Art

A three-dimensional measurement technology using an image obtained by picking up a measurement target can be utilized for various purposes such as three-dimensional model generation from a real object and position and orientation measurement of an object. According to a stereo method corresponding to one of representative methods for the three-dimensional measurement technology using the images, the three-dimensional measurement is performed in accordance with a principle of triangulation based on images picked up by two cameras (stereo cameras) where relative position and orientation are known in advance. In addition, to increase the reliability of the three-dimensional measurement, a method of replacing one camera of the stereo cameras by an illuminating apparatus such as a projector that projects a pattern for the three-dimensional measurement onto a measurement target object is widely employed.

However, since a lens of the camera or the projector expands or contracts in accordance with a temperature, even when no physical position change between the camera and the measurement target object occurs, a shift of a position of a point on the measurement target object on an image sensor of the camera may be caused by a temperature change. Similarly, a shift of a position in a three-dimensional space of the pattern projected by the projector may also be caused by the temperature change.

The temperature of the lens changes by an outside air temperature or an internal temperature of the device such as the camera or the projector, and the lens expands or contracts. To perform the three-dimensional measurement at a high accuracy despite the presence of the temperature change of the lens, the shift caused by the expansion or contraction of the lens derived from the temperature change needs to be corrected.

Japanese Patent Laid-Open No. 2002-135765 discloses a method of performing a calibration of camera parameters under a plurality of temperatures in advance and switching the camera parameters in accordance with a measured value of a temperature sensor attached in the vicinity of the camera.

Japanese Patent Laid-Open No. 2002-135765 discloses a method of performing a calibration under a plurality of discrete temperatures. However, since only the calibration under the discrete and limited temperatures is performed according to the technology disclosed in Japanese Patent Laid-Open No. 2002-135765, it is difficult to perform an appropriate calibration in accordance with various temperature changes.

SUMMARY OF THE INVENTION

The present disclosure has been made in view of the above-described problems and provides a technology with which it is possible to perform a three-dimensional measurement at a high accuracy by deciding a parameter in accordance with a temperature change.

According to an aspect of the present disclosure, for example, an information processing apparatus that decides a temperature-dependent parameter of a projection apparatus configured to project a pattern onto a measurement target object to perform a three-dimensional measurement includes a holding unit configured to hold a relationship in which the temperature-dependent parameter of the projection apparatus is set as a temperature function, a temperature input unit configured to input a temperature of the projection apparatus, and a temperature-dependent parameter decision unit configured to decide the temperature-dependent parameter of the projection apparatus based on the temperature of the projection apparatus which is input by the temperature input unit and the relationship.

Further features of the present disclosure will become apparent from the following description of exemplary embodiments with reference to the attached drawings.

BRIEF DESCRIPTION OF THE DRAWINGS

FIG. 10 illustrates a configuration of an information processing apparatus according to a third exemplary embodiment.

DESCRIPTION OF THE EMBODIMENTS

Hereinafter, exemplary embodiments for carrying out the present disclosure will be described with reference to the drawings.

First Exemplary Embodiment

Camera Parameter Correction

According to the present exemplary embodiment, a three-dimensional measurement apparatus constituted by a camera and a projector will be described.

Figure 1:
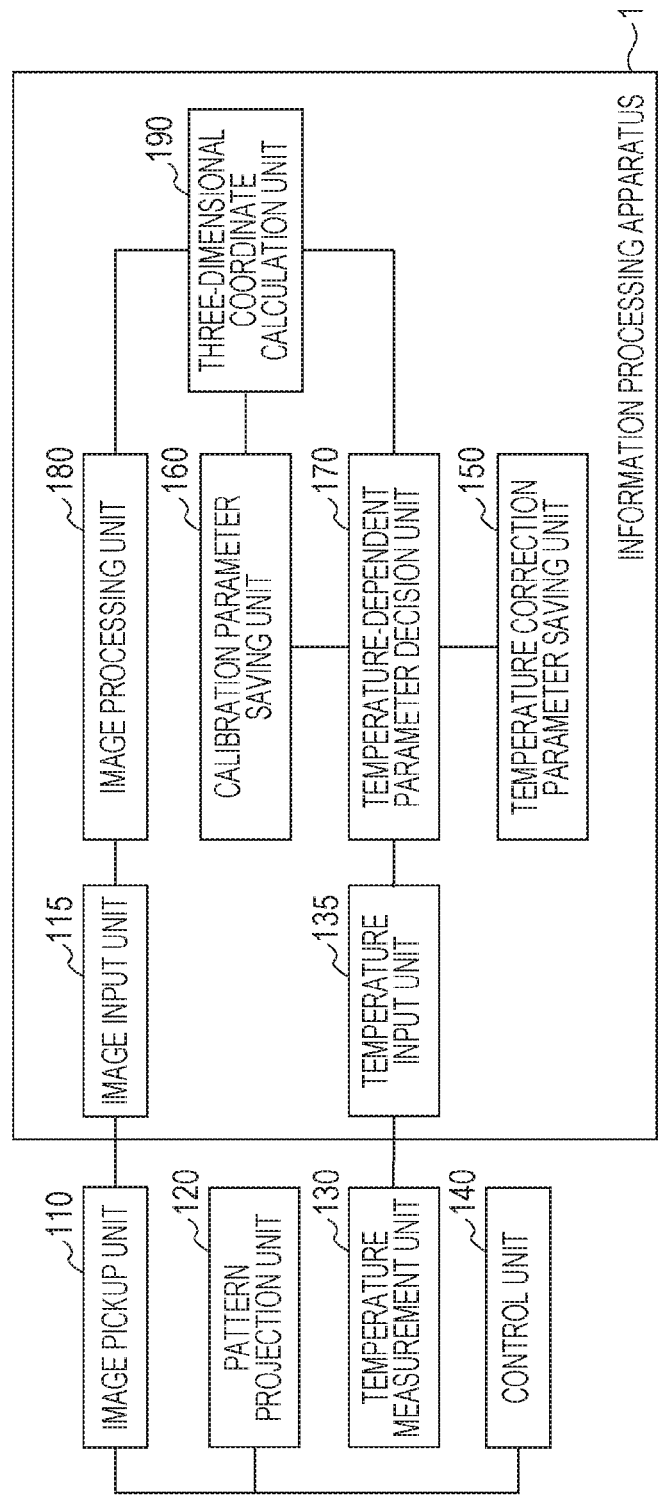
FIG. 1 illustrates a configuration of an information processing apparatus according to a first exemplary embodiment.

According to the present exemplary embodiment, an accuracy of the three-dimensional measurement in a case where a shift of a position of a point picked up on a picked-up image is caused by a temperature change of an outside air temperature or an internal temperature of a device is improved. Specifically, a relationship between a temperature of a camera lens and a temperature dependent calibration parameter is previously obtained, and a correction of the temperature dependent calibration parameter is performed on the basis of a temperature of the camera lens which is measured by a temperature sensor. That is, according to the present exemplary embodiment, a value of a calibration parameter having a temperature dependency among calibration parameters is decided in accordance with the measured temperature. FIG. 1 illustrates a configuration of an information processing apparatus 1 connected to the three-dimensional measurement apparatus according to the present exemplary embodiment. The information processing apparatus 1 is constituted by an image input unit 115, a temperature input unit 135, a temperature correction parameter saving unit 150, a calibration parameter saving unit 160, a temperature-dependent parameter decision unit 170, an image processing unit 180, and a three-dimensional coordinate calculation unit 190. As used herein, the term "unit" generally refers to any combination of software, firmware, hardware, or other component that is used to effectuate a purpose.

An image pickup unit 110, a pattern projection unit 120, a temperature measurement unit 130, and a control unit 140 are connected to the information processing apparatus 1. Hereinafter, the respective units constituting the information processing apparatus 1 and the respective units connected to the information processing apparatus 1 will be described.

The image pickup unit 110 is a camera configured to pick up a measurement target object to obtain a grayscale image or a color image. The pattern projection unit 120 is a projector configured to project an illumination light pattern onto a measurement target object.

According to the present exemplary embodiment, the projector is configured to project a spatial coding pattern based on a spatial coding method which is generally used as a three-dimensional measurement technique. The camera and the projector are fixed so that relative position and orientation cannot be changed. Internal parameters of the camera and the projector (a focal length, an image center position, and lens distortion parameters) and relative position and orientation between the camera and the projector are calibrated in advance and saved in the calibration parameter saving unit 160 as calibration parameters.

Herein, the focal length is obtained by dividing a physical distance between a lens center of the camera (projector) and an image plane by a pixel pitch. The image center position corresponds to image coordinates of an intersection point of an optical axis of the camera (or the projector) and the image plane. The lens distortion parameters are a coefficient representing a radial distortion and a tangential distortion. The calibration method will be described below.

The temperature measurement unit 130 is a temperature sensor configured to measure a temperature of the camera lens. The temperature sensor is constituted, for example, by a thermistor or the like. According to the present exemplary embodiment, the temperature sensor is arranged, for example, on a focus ring of the camera lens.

The control unit 140 performs operation control of the image pickup unit 110 and the pattern projection unit 120. The control unit 140 is realized by a configuration similar to a general computer. The projector performs switching and projecting of projected patterns on the basis of an instruction signal from the control unit 140. The camera picks up an image of the measurement target object onto which the pattern is projected by the projector on the basis of the instruction signal from the control unit 140.

The image input unit 115 is connected to the image pickup unit 110 and inputs the image of the measurement target object onto which the pattern is projected by the projector which is picked up by the camera. The image input is performed via an interface of a camera link, for example. However, the image input method is not limited to this, and the image may be input via the other interface such as USB, IEEE1394, or GbE. It is not necessary that the image input unit 115 may not be connected to the image pickup unit 110 when the image of the measurement target object is picked up. The image pickup is performed in advance, and the image is saved on a storage medium that is not illustrated in the drawing. After the image pickup, the image input unit 115 may read out and input the picked-up image saved on the storage medium.

The temperature input unit 135 is connected to the temperature measurement unit 130 and inputs the temperature of the camera lens measured by the temperature sensor. The temperature input unit 135 may directly input temperature value itself as the temperature information for the correction or may input the A/D converted voltage information of the thermistor and convert the voltage information into the temperature value.

The temperature correction parameter saving unit 150 saves a relationship between the temperature of the camera lens and calibration parameters that are set as correction targets (hereinafter, referred to as correction target calibration parameters). The correction target calibration parameters are included in the calibration parameters saved in the calibration parameter saving unit 160. The relationship between the temperature and the correction target calibration parameters is assumed to be calibrated in advance. The relationship between the temperature and the correction target calibration parameters is represented, for example, as a relationship where the temperature is set as an independent variable, and the correction target calibration parameters are set as dependent variables. According to the present exemplary embodiment, the relationship between the temperature and the correction target calibration parameters is represented by a linear function. When this relationship is represented by an explicit function such as the linear function, it is possible to perform the appropriate decision on the correction target calibration parameters with respect to various temperatures. The calibration method will be described below.

The temperature-dependent parameter decision unit 170 decides values of the correction target calibration parameters, which corresponds to the parameters having the temperature dependency among the calibration parameters. The decision on the correction target calibration parameters is performed on the basis of the temperature of the camera lens at the time of the image pickup which is measured by the temperature measurement unit 130 and the relationship between the temperature of the camera lens and the correction target calibration parameters held by the temperature correction parameter saving unit 150.

The image processing unit 180 detects boundary coordinates of a spatial code from the picked-up image input by the image input unit 115 and associates them with corresponding boundary coordinates on the projection pattern.

The three-dimensional coordinate calculation unit 190 calculates three-dimensional coordinates with regard to each of correspondences between the boundary coordinates of the spatial code on the picked-up image obtained by the image processing unit 180 and the boundary coordinates on the projection pattern.

Figure 2:
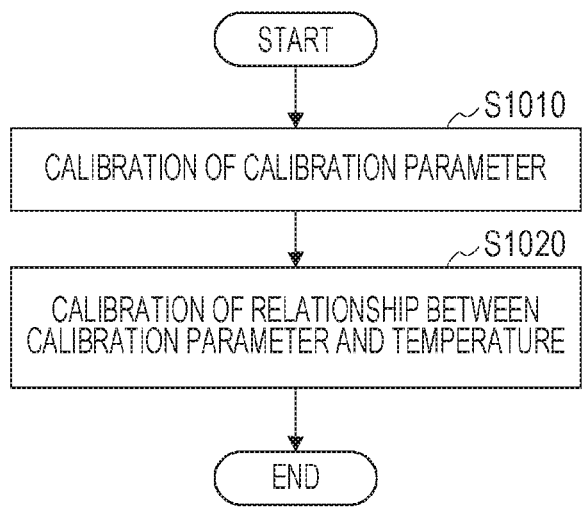
FIG. 2 is a flow chart illustrating a processing procedure of a calibration according to the first exemplary embodiment.

Next, descriptions will be given of the calibration of the calibration parameters which is carried out before the three-dimensional measurement is performed and the calibration of the relationship between the temperature and the calibration parameters. FIG. 2 is a flow chart illustrating a processing procedure of the calibration according to the present exemplary embodiment.

Step S1010

In step S1010, the calibration of the calibration parameters is performed. The calibration of the calibration parameters is performed in a state in which the inside of the three-dimensional measurement apparatus is sufficiently warmed up and operated. In addition, the temperature of the camera lens is also measured at the same time as the pickup of the image for the calibration of the calibration parameters. The measured temperature is set as a reference temperature in the correction of the correction target calibration parameters. The calibration method for the calibration parameters will be described below.

Step S1020

In step S1020, the calibration of the relationship between the temperature of the camera lens and the correction target calibration parameters is performed. The calibration of the relationship between the temperature of the camera lens and the correction target calibration parameters is performed on the basis of the temperature change in the image coordinates at a certain point physically located in the same position. The calibration method for the relationship between the temperature of the camera lens and the correction target calibration parameters will be described below.

Figure 3:
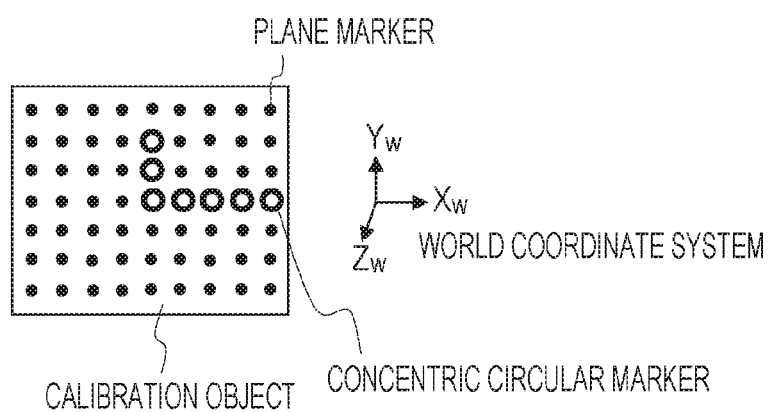
FIG. 3 illustrates a calibration object used for calibration of calibration parameters.
Figure 4:
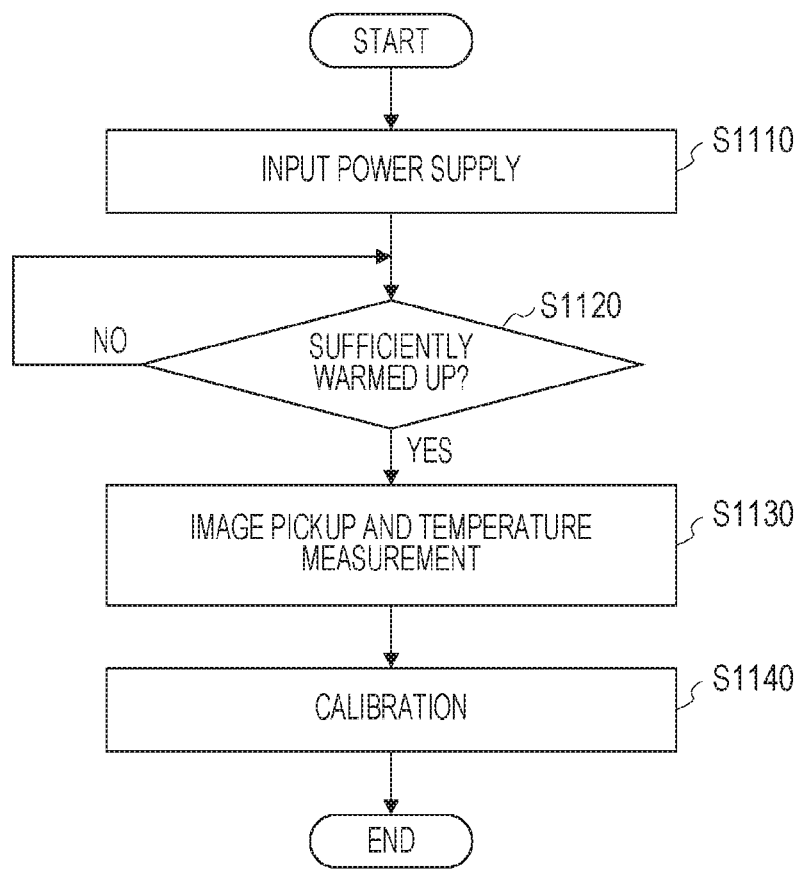
FIG. 4 is a flow chart illustrating a processing procedure of the calibration of the calibration parameters.
Figure 5A:
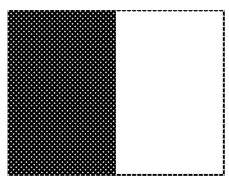
FIGS. 5A to 5D illustrate examples of a spatial coding pattern.
Figure 5B:
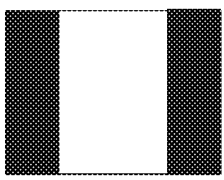
Figure 5C:
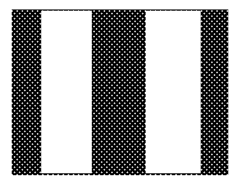
Figure 5D:
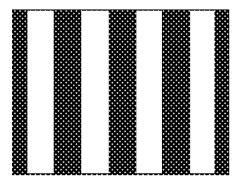

The calibration of the calibration parameters in step S1010 will be described. FIG. 3 illustrates a calibration object used for the calibration of the calibration parameters. As illustrated in FIG. 3, circular fiducials (hereinafter, referred to as circular markers) are arranged at a regular interval on a plane constituting the calibration object. In addition, to define a coordinate system on the calibration object, a part of the circular markers is set to have a concentric circular shape (hereinafter, the circular marker having the concentric circular shape will be referred to as concentric circular marker). The concentric circular markers are arranged so as to form an L shape, and the center position of the concentric circular marker corresponding to a part at the corner of the L shape is set as the origin of the calibration object. A normal direction of the plane is set as a Z-axis of the calibration object, the longer direction of the L shape is set as an X-axis, and the other direction of the L shape is set as a Y-axis. This calibration object is also used in the calibration of the relationship between the temperature and the calibration parameters. FIG. 4 is a flow chart illustrating a processing procedure of the calibration of the calibration parameters.

Step S1110

In step S1110, the power supply of the camera or the projector is turned on to activate the three-dimensional measurement apparatus. After the power supply is turned on, the projection and image pickup of the spatial coding pattern is repeated at a certain interval, and the apparatus is warmed up and operated.

Step S1120

In step S1120, a determination on whether or not the apparatus is sufficiently warmed up and operated is performed. For example, the determination is performed on the basis of whether or not a fluctuation of the temperature of the camera lens at a predetermined time interval is below a certain threshold. In a case where the apparatus is sufficiently warmed up and operated, the flow advances to step S1130.

Step S1130

In step S1130, the pickup of the image for the calibration and the measurement of the temperature of the camera lens are performed. The pickup of the image for the calibration is performed by the image pickup unit 110. The measurement of the temperature of the camera lens is performed by the temperature measurement unit 130. When the pickup of the image for the calibration is performed, the position and orientation of the calibration object with respect to the three-dimensional measurement apparatus are changed, and an image onto which the spatial coding pattern is projected and an evenly illuminated image onto which a uniform pattern is projected are repeatedly picked up. The projection of the pattern is performed by the pattern projection unit 120. A gray code pattern is projected as the spatial coding pattern, and patterns both in horizontal and vertical directions are projected.

FIGS. 5A to 5D illustrate examples of the gray code pattern corresponding to 1 bit to 4 bits. As illustrated in FIGS. 5A to 5D, the gray code pattern is set to have a stripe pattern.

Furthermore, the calibration object is arranged in a predetermined position with respect to the three-dimensional measurement apparatus, and the image of the calibration object is picked up by projecting the uniform pattern. The image obtained by the image pickup is used for the calibration of the relationship between the temperature of the camera lens and the correction target calibration parameters in step S1020. The temperature of the camera lens at a time when the calibration object is picked up is saved as a correction reference temperature Trefc in the temperature correction parameter saving unit 150.

Step S1140

In step S1140, the calibration parameters are calculated on the basis of the image obtained by the image pickup in step S1130.

First, detection and association of the circular markers on the calibration object are performed with respect to the respective images of the calibration object onto which the uniform pattern is projected. Herein, the association refers to a decision on which circular marker detected on the image corresponds to which circular marker on the calibration object. As illustrated in FIG. 3, the calibration object is white, and the circular markers are black. Therefore, binarization of the image and labeling processing of the black regions are performed to extract the circular regions, and threshold-based processing is performed on the areas of candidates of the respective circular regions to detect the areas corresponding to the circular markers. In addition, with respect to the concentric circular markers that define the coordinate system, similarly on the basis of the results of the binarization and the labeling processing, the concentric circular markers are detected as the regions where the white region exists in the black region and the area is larger than or equal to a predetermined area. When the detection of the circular markers is ended, the association between the detected circular markers and the circular markers on the calibration object is performed. First, two straight lines on which the concentric circular markers are placed are estimated on the image, and the concentric circular marker in the vicinity of an intersecting point of the two straight lines is associated with the concentric circular marker at the origin. The association of the other circular markers is performed on the basis of the concentric circular marker associated with the origin and directions of the above-described two straight lines.

Next, the intersecting points of the boundaries of the spatial codes in the horizontal direction and the vertical direction are calculated from the image group of the calibration object onto which the spatial coding pattern is projected, and the association of the intersecting points on the projection pattern is repeated. First, each picked-up image of the calibration object that is illuminated by respective patterns constituting the gray code pattern is binarized, and a binarization result (0 or 1) is arranged for each pixel to calculate a code (spatial code). The spatial code represents an ID of the line on the pattern projected on the relevant pixels, and the spatial code is calculated for each of the horizontal direction and the vertical direction. With respect to each of the horizontal direction and the vertical direction, the boundary coordinates of the spatial code on the picked-up image are calculated on the basis of these results. Next, by using the boundaries of the spatial codes in the horizontal direction and the vertical direction, the coordinates of the intersecting points of the patterns in the horizontal direction and the vertical direction are calculated. The coordinates on the camera image of the respective intersecting points and the coordinates on the projection pattern can be associated with each other by the spatial code.

When the association of the circular markers and the association of the intersecting point of the boundaries of the spatial codes are ended, the calibration parameters are calculated on the basis of the association results. The calculation of the calibration parameters is performed, for example, by the method of Moreno, et al. (D. Moreno and G. Taubin, "Simple, Accurate, and Robust Projector-Camera Calibration," Proc. 2nd International Conference on 3D Imaging, Modeling, Processing, Visualization and Transmission (3DIMPVT 2012), pp. 464-471, 2012). The calibration parameters are saved in the calibration parameter saving unit 160.

Figure 6:
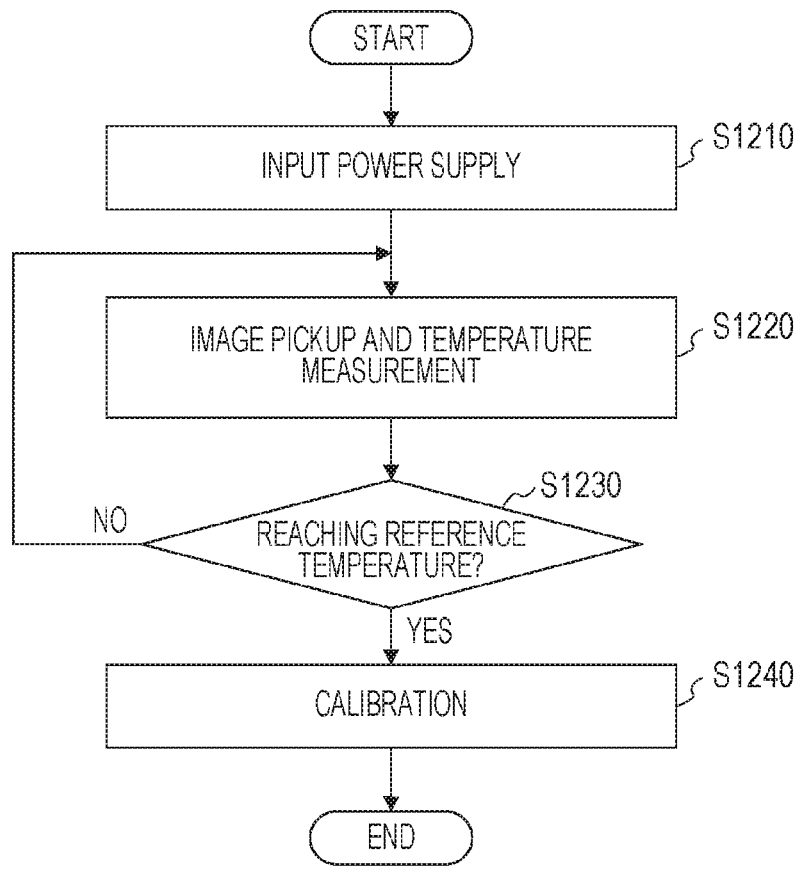
FIG. 6 is a flow chart for describing a processing procedure of a calibration of a relationship between the calibration parameters and a temperature.

Next, the calibration of the relationship between the correction target calibration parameters and the temperature of the camera lens in step S1020 will be described. FIG. 6 is a flow chart for describing a processing procedure of the calibration of the relationship between the correction target calibration parameters and the temperature of the camera lens.

Step S1210

In step S1210, the power supply of the camera or the projector is turned on to activate the three-dimensional measurement apparatus.

Step S1220

In step S1220, the pickup of the image for the calibration and the measurement of the temperature of the camera lens are performed. Herein, one position among the positions arranged in step S1130 is set as a predetermined position. The calibration object is arranged in the predetermined position, and the uniform pattern is projected, so that the image pickup and the temperature measurement are performed. It is noted that the predetermined position in which the calibration object is arranged is not changed during the image pickup. After the image pickup is ended, the process stands by for a certain time period (for example, 5 minutes), and then the image pickup is performed again. During the waiting time too, the projection of the spatial coding pattern and the image pickup are performed at an interval of a certain time period to increase the temperature inside the three-dimensional measurement apparatus.

Step S1230

In step S1230, it is determined whether or not the temperature of the camera lens reaches the correction reference temperature Trefc, and when the temperature reaches the correction reference temperature Trefc, the flow advances to step S1240.

Step S1240

Figure 7:
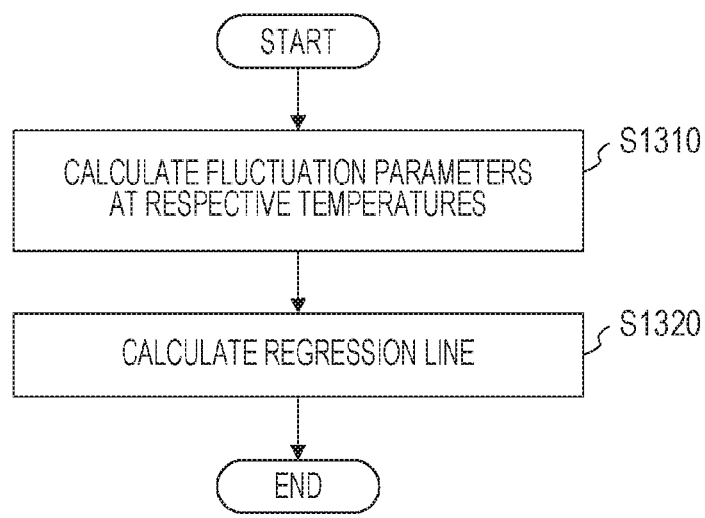
FIG. 7 is a flow chart for describing a procedure of calculating the relationship between the calibration parameters and the temperature.

In step S1240, a relationship between the correction target calibration parameters and the temperature change of the camera lens is calculated. FIG. 7 is a flow chart for a calculation procedure for the relationship between the correction target calibration parameters and the temperature of the camera lens.

Step S1310

In step S1310, a fluctuation parameter of the image coordinates of the circular markers on the calibration object is estimated for each of the picked-up images obtained in step S1220. Herein, the fluctuation parameter is a parameter representing the fluctuation of the image coordinates of the circular marker which is caused by the temperature change of the camera lens. According to the present exemplary embodiment, the image coordinates (ui(T), vi(T)) of the respective circular markers (i) expand or contract by the temperature change in a direction connecting the image coordinates (ui(Trefc), vi(Trefc)) of the circular marker at the correction reference temperature Trefc and the image centers (cx, cy) to each other. Therefore, a rate of expansion and contraction is set as the fluctuation parameter. The rate of expansion and contraction is set to be common to the respective markers and represented by k(T). The image coordinates (ui(T), vi(T)) at a temperature T are represented as Expression 1.

$$u_i(T)=u_i(T_{refc})+k(T)(u_i(T_{refr})-c_x)$$

$$v_i(T)=v_i(T_{refc})+k(T)(v_i(T_{refr})-c_y) \quad (1)$$

First, the detection and the association of the circular markers are previously performed for the respective images by the same method as step S1140. Expression 1 with respect to all the circular markers detected on the images obtained by the image pickup at the certain temperature T is solved as a simultaneous equation, so that the common parameter k(T) can be calculated. In this case, since the number of equations is higher than the number of unknown letters, k(T) is calculated by a least square method. This processing is performed for each of the images picked up in step S1220, and the rate of expansion and contraction k(T) is obtained for every plural temperatures T.

Step S1320

In step S1320, to obtain a relationship between the temperature T and the correction target calibration parameters, first, an estimation of a regression line is performed on the rate of expansion and contraction k(T) obtained in step S1310 and the temperature T. The estimated regression line is represented by k(T)=aT+b. When the estimation of the regression line is performed, k(T) is set as 0 in a case where the temperature is at Trefc. Next, a relationship between the correction target calibration parameters and the temperature T is obtained. According to the present exemplary embodiment, the correction target calibration parameters correspond to the focal length fx in the horizontal direction and the focal length fy in the vertical direction. Herein, image coordinates of the circular marker (i) in a case where the focal length is virtually set as 1 and an intersecting point of the image plane and the optical axis is set as the origin (hereinafter, referred to as normalized image coordinates) are represented by (xi, yi). Therefore, a relationship between the normalized image coordinates (xi, yi) and the image coordinates (ui, vi) is represented as Expression 2 when the image center position is set as (cx, cy).

$$u_i = f_x x_i + c_x$$
$$v_i = f_y x_i + c_y \quad (2)$$

When the image coordinates (ui(Trefc), vi(Trefc)) of the circular marker at the correction reference temperature Trefc satisfy Expression 2, Expression 1 can be written as Expression 3.

$$u_i(T) = (1+k(T)) f_{xref} x_i + c_x$$
$$v_i(T) = (1+k(T)) f_{yref} y_i + c_y \quad (3)$$

It is noted that the focal lengths of the camera at the correction reference temperature Trefc are set as fxref (horizontal direction) and fyref (vertical direction). Since the relationship between the rate of expansion and contraction k(T) and the temperature T is k(T)=aT+b, the focal length fx(T) (horizontal direction) and the focal length fy(T) (vertical direction) at the temperature T are represented as Expression 4.

$$f_x(T) = (1+aT+b) f_{xref}$$
$$f_y(T) = (1+aT+b) f_{yref} \quad (4)$$

Therefore, it is possible to calculate the focal lengths fx(T) and fy(T) at the temperature T from parameters a and b representing the regression line and the focal lengths fxref and fyref at the correction reference temperature Trefc. The parameters a and b representing the regression line are saved in the temperature correction parameter saving unit 150.

Figure 8:
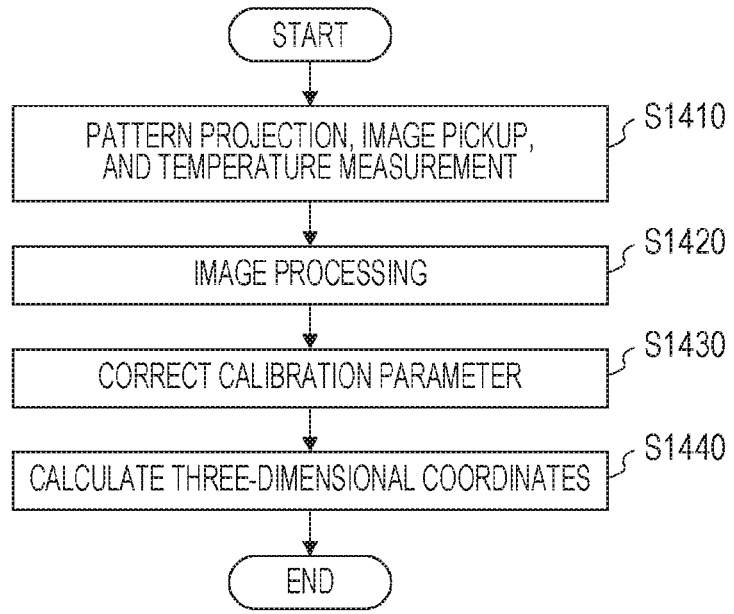
FIG. 8 is a flow chart illustrating a processing procedure of a three-dimensional measurement according to the first exemplary embodiment.

Next, a method of performing the three-dimensional measurement while the calibration parameters are corrected (decided) in accordance with the temperature will be described. FIG. 8 is a flow chart illustrating a processing procedure of the three-dimensional measurement according to the present exemplary embodiment.

Step S1410

In step S1410, the image of the measurement target object onto which the spatial coding pattern (gray code pattern) is projected by the pattern projection unit 120 is picked up by the image pickup unit 110. The pattern projection unit 120 switches and displays the plurality of patterns constituting the gray code pattern. The control unit 140 transmits an instruction signal indicating the pattern to be projected to the pattern projection unit 120. When the pattern is projected onto the measurement target object, the control unit 140 instructs the image pickup unit 110 to pick up images of the measurement target object. According to the present exemplary embodiment, when the three-dimensional measurement is performed, the pattern projection unit 120 projects only the gray code pattern in the vertical direction. In addition, the measurement of the temperature of the camera lens is also performed by the temperature measurement unit 130 at the same time as the image pickup. The image input unit 115 inputs the image group obtained by the image pickup unit 110 through the image pickup. The temperature input unit 135 inputs the temperature of the camera lens measured by the temperature measurement unit 130.

Step S1420

In step S1420, a set of correspondences between the image coordinates on the picked-up image and the horizontal coordinate on the projection pattern is obtained on the basis of the images obtained in step S1410 through the image pickup. The specific method is the same as the calculation method for the boundary of the spatial code in step S1140 described above, and the descriptions thereof will be omitted.

Step S1430

In step S1430, the correction target calibration parameters are corrected on the basis of the temperature of the camera lens which is measured in step S1410. The correction target calibration parameters according to the present exemplary embodiment are the focal lengths of the camera. The correction of the focal length of the camera is performed by substituting the parameters a and b of the regression line saved in the temperature correction parameter saving unit 150 and the temperature Tobs of the camera lens measured in step S1410 to Expression 4.

Step S1440

In step S1440, the three-dimensional coordinates of the surface of the measurement target object are calculated with respect to each of the correspondences obtained in step S1420. The calculation of the three-dimensional coordinates is performed by using the focal length of the camera corrected in step S1430 and the calibration parameters other than the focal length of the camera saved in the calibration parameter saving unit 160. The calculation method for the three-dimensional coordinates includes a method of obtaining the three-dimensional coordinates as an intersecting point of a straight line passing through a point on the picked-up image and the lens center of the camera (hereinafter, referred to as line-of-sight vector) and a plane passing through the lens center of the projector and the vertical line. It is however noted that the calculation method for the three-dimensional coordinates is not limited to this, and in a case where picked-up image coordinates of a point and coordinates on the projection pattern can be obtained, the three-dimensional coordinates may be calculated by the least square method on the basis of the simultaneous equation.

As described above, according to the present exemplary embodiment, the method has been described in which the relationship between the temperature of the camera lens and the correction target calibration parameters is previously obtained, and the correction target calibration parameters are corrected on the basis of the temperature of the camera lens measured by the temperature sensor when the three-dimensional measurement is performed. Accordingly, even when the position on the picked-up image of the picked-up point is shifted by the temperature change of the outside air temperature or the internal temperature of the device, it is possible to perform the three-dimensional measurement at a high accuracy.

According to the present exemplary embodiment, the spatial coding pattern is used as the pattern projected from the projector. However, the pattern projected by the projector is not limited to this, and other patterns for performing the three-dimensional measurement may be used. For example, a projector may project patterns for a phase shift method as the projector that projects a plurality of patterns. In addition, a single pattern used in a three-dimensional measurement technique by Ohta et al. (Ohta et al., High Speed 3D Reconstruction Method from Dense Grid Pattern Using de Bruijn Sequence and Line Detection Technique Based on Belief-Propagation, The Transactions of the Institute of Electronics, Information and Communication Engineers of Japan (D), vol. J93-D, no. 8, pp. 1544-1554, 2010) may also be used.

According to the present exemplary embodiment, the planar calibration object is used when the relationship between the temperature and the correction target calibration parameters is obtained. However, the calibration object is not limited to this, and any shape may be adopted so long as fiducials are arranged on the calibration object, and a correspondence of the physically same fiducial is found among the image picked up while the temperature is changed. For example, a cubic calibration object in which fiducials are arranged on a cube or a rectangular parallelepiped may be used.

According to the present exemplary embodiment, the relationship between the temperature and the correction target calibration parameters is obtained as the regression line. However, the representation method for the relationship between the temperature and the correction target calibration parameters is not limited to this, and any representation method may be employed so long as the relationship of those is appropriately represented, and the correction target calibration parameters can be uniquely decided on the basis of the temperature. For example, the relationship may be represented by a quadratic function.

According to the present exemplary embodiment, the temperature sensor (thermistor) is arranged on the focus ring of the lens. However, the position for arranging the temperature sensor is not limited to this, and the temperature sensor may be arranged in any position so long as the correction target calibration parameters are changed by the temperature change in the arrangement position. For example, the temperature sensor may be arranged on a mount part of the lens or arranged on a substrate.

According to the present exemplary embodiment, the pickup of the images for obtaining the relationship between the temperature and the correction target calibration parameters is performed during a period from when the power supply is input to the apparatus until when the temperature reaches the correction reference temperature. However, the image pickup method is not limited to this. For example, after the power supply of the apparatus is turned on to sufficiently warm up the apparatus, the image pickup may be then started, and the image pickup may be performed while the temperature is decreased without performing the projection and the image pickup of the pattern in a period except for the period for the image pickup. When the above-described image pickup is performed, it is possible to correct the correction target calibration parameters in a state in which the apparatus is relatively stable. In addition, the image pickup may be performed while a temperature of a room where the calibration of the apparatus is performed is changed. When the above-described image pickup is performed, it is possible to perform the measurement at a high accuracy even when the temperature in the environment where the three-dimensional measurement apparatus is used is changed.

Second Exemplary Embodiment

Projector Parameter Correction

According to the first exemplary embodiment, the temperature of the camera lens of the three-dimensional measurement apparatus is measured to correct the correction target calibration parameters of the camera. According to the present exemplary embodiment, a temperature of the projector lens is further measured to correct the correction target calibration parameters of the projector.

A configuration of the three-dimensional measurement apparatus according to the present exemplary embodiment is the same as the configuration of the three-dimensional measurement apparatus according to the first exemplary embodiment.

According to the second exemplary embodiment, the temperature measurement unit 130 also measures the temperature of the projector lens in addition to the temperature of the camera lens. According to the present exemplary embodiment, the temperature sensor is arranged on a focus ring of the projector lens.

The temperature correction parameter saving unit 150 also saves the relationship between the temperature of the projector lens and the correction target calibration parameters in addition to the relationship between the temperature of the camera lens and the correction target calibration parameters. Furthermore, the temperature-dependent parameter decision unit 170 also corrects the correction target calibration parameters of the projector in addition to the correction target calibration parameters of the camera.

Next, the calibration of the calibration parameters and the calibration of the relationship between the temperature and the correction target calibration parameters according to the present exemplary embodiment will be described. A general processing procedure of the calibration according to the present exemplary embodiment is substantially the same as the first exemplary embodiment. Herein, the descriptions will be given while step S1010 in FIG. 2 is regarded as step S2010, and step S1020 is regarded as step S2020.

The calibration of the calibration parameters in step S2010 is basically the same as step S1010 according to the first exemplary embodiment. It is however noted that, in step S1130, when the calibration object is arranged in the predetermined position with respect to the three-dimensional measurement apparatus, images of the calibration object onto which the spatial coding patterns in the horizontal and vertical directions are projected are also picked up. In addition, the temperature of the projector lens at that time is saved as a correction reference temperature Trefp in the temperature correction parameter saving unit 150.

Next, the calibration of the relationship between the correction target calibration parameters and the temperature in step S2020 will be described. A general processing procedure of the calibration of the relationship between the correction target calibration parameters and the temperature according to the present exemplary embodiment is substantially the same as the first exemplary embodiment. Herein, steps S1210, S1220, S1230, and S1240 in FIG. 2 are respectively referred to as steps S2210, S2220, S2230, and S2240.

Step S2210

In step S2210, the power supply of the camera or the projector is turned on to activate the three-dimensional measurement apparatus.

Step S2220

In step S2220, the pickup of the images for the calibration and the measurement of the temperatures of the camera lens and the projector lens are performed. Herein, the calibration object is arranged in the same position as the arrangement position in step S1130, and the uniform pattern and the spatial coding pattern are projected to perform the image pickup and the temperature measurement. After the image pickup is ended, the process stands by for a certain time period (for example, 5 minutes), and then the image pickup is performed again. During the waiting time too, the projection of the spatial coding pattern and the image pickup are performed at a certain time interval to increase the temperature inside the three-dimensional measurement apparatus.

Step S2230

In step S2230, it is determined whether or not both the temperature of the camera lens and the temperature of the projector lens reach the correction reference temperatures Trefc and Trefp, and when both the temperatures reach the correction reference temperatures, the flow advances to step S2240.

Step S2240

Figure 9:
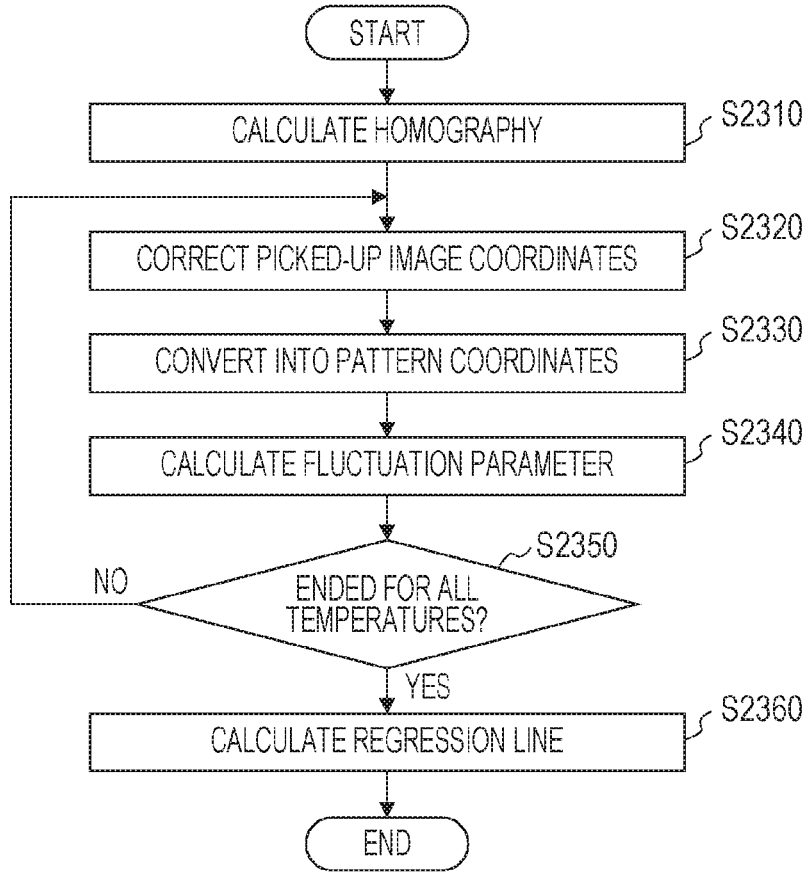
FIG. 9 is a flow chart for describing a procedure of calculating a relationship between calibration parameters of a projector and a temperature.

In step S2240, a relationship between the correction target calibration parameters and the temperature is calculated. First, a relationship between the correction target calibration parameters of the camera and the temperature is calculated. A calculation method for the relationship between the correction target calibration parameters of the camera and the temperature is the same as the first exemplary embodiment, and the descriptions thereof will be omitted. Next, a method of calculating the relationship between the correction target calibration parameters of the projector and the temperature will be described. FIG. 9 is a flow chart for describing the calculation procedure for the relationship between the correction target calibration parameters of the projector and the temperature.

Step S2310

First, in step S2310, the coordinates of the intersecting points of the patterns in the horizontal direction and the vertical direction are calculated by the processing described in step S1140 according to the first exemplary embodiment to be associated with the coordinates on the projection pattern. For the calculation for the coordinates of the intersecting points, the images of the calibration object picked up in step S2010 onto which the spatial coding pattern is projected are used.

A homography transform H for transforming the coordinates on the picked-up image into coordinates on the projection pattern is calculated from the obtained correspondence of the coordinates of the intersecting points. The calculation for the homography transform is performed, for example, by DLT method (R. Hartley, A. Zisserman, "Multiple View Geometry in Computer Vision", Cambridge University Press). According to this homography transform, the coordinates on the picked-up image are correctly transformed into the coordinates on the projection pattern in a case where the lens temperature of the camera or the projector is the correction reference temperature.

In step S2320 to step S2340, processing for each temperature is performed on the image group obtained by the image pickup at the different temperatures in step S2220. First, in step S2320, the coordinates of the intersecting points of the patterns in the horizontal direction and the vertical direction are calculated by the same method as step S2310 from the image of the calibration object onto which the spatial coding pattern is projected at a certain temperature and associates them with the coordinates on the projection pattern. Subsequently, the coordinates on the picked-up image of the intersecting points are corrected into the coordinates at the time of the correction reference temperature. From Expression 1, the coordinates are represented as Expression 5, and the correction is performed by using the already calculated rate of expansion and contraction k(T) of the camera.

$$u_i(T_{refc}) = \frac{u_i(T) + k(T)c_x}{1 + k(T)} \quad (5)$$
$$v_i(T_{refc}) = \frac{v_i(T) + k(T)c_y}{1 + k(T)}$$

The correction of the coordinates is performed with respect to all the associated intersecting points.

Next, in step S2330, the coordinates on the picked-up image corrected on the basis of Expression 5 are transformed into the coordinates of the projection pattern by the homography transform H. The transformed coordinates are the coordinates of the projection pattern at the temperature T and are shifted with respect to the original coordinates on the projection pattern by the temperature change of the projector lens. The coordinate transform is performed with respect to all the associated intersecting points.

Subsequently, in step S2340, the rate of expansion and contraction kp(T) on the projector side is obtained. The calculation method for kp(T) is the same as the calculation method for the fluctuation parameter on the camera side in step S1310, and the descriptions thereof will be omitted.

In step S2350, it is determined whether or not the processing is performed for the image group at all the temperatures, and in a case where the processing is ended, the flow advances to step S2360. In a case where the processing is not ended, the flow returns to step S2320.

In step S2360, similarly as in step S1320, the estimation of the regression line with regard to the fluctuation parameter kp(T) obtained in step S2340 and the data of the temperature T. The regression line is represented by kp(T)=apT+bp. The focal lengths of the camera at the correction reference temperature Trefp are set as fpxref (horizontal direction) and fpyref (vertical direction). Since the relationship between kp(T) and the temperature T is kp(T)=apT+bp, the focal lengths fpx(T) (horizontal direction) and fpy(T) (vertical direction) at the temperature T are represented as Expression 6.

$$f_{px}(T) = (1 + a_p T + b_p) f_{pxref}$$
$$f_{py}(T) = (1 + a_p T + b_p) f_{pyref} \quad (6)$$

Therefore, it is possible to calculate the focal lengths fpx(T) and fpy(T) at the temperature T from the parameters ap and bp representing the regression line and the focal lengths fpxref and fpyref at the correction reference temperature Trefp. The parameters ap and bp representing the regression line are saved in the temperature correction parameter saving unit 150.

Next, the three-dimensional measurement according to the present exemplary embodiment will be described. A general processing procedure of the three-dimensional measurement according to the present exemplary embodiment is substantially the same as the first exemplary embodiment. Herein, steps S1410, S1420, S1430, and S1440 in FIG. 8 are referred to as steps S2410, S2420, S2430, and S2440. Since the processings in steps S2420 and S2440 are the same as steps S1420 and S1440, the descriptions thereof will be omitted. In step S2410, the temperature of the projector lens is measured in addition to the temperature of the camera lens. In step S2430, the focal lengths of the camera and the projector are corrected on the basis of the temperatures of the camera lens and the projector lens measured in step S2410.

As described above, according to the present exemplary embodiment, the method of previously obtaining the relationship between the temperature of the projector lens and the correction target calibration parameters and correcting the correction target calibration parameters on the basis of the temperature of the projector lens at a time when the three-dimensional measurement is performed has been described. Accordingly, even when the position of the point projected by the projector is shifted by the temperature change of the outside air temperature or the internal temperature of the device, it is possible to perform the three-dimensional measurement at a high accuracy.

It is noted that the information processing apparatus described in the above exemplary embodiment can also be realized by an information processing apparatus having a configuration similar to a general personal computer. In this case, the above-described processings are realized by executing a computer program that is programmed to execute functions of performing the processings in the respective steps.

According to the above-described exemplary embodiment, both the focal length fx in the horizontal direction (fpx) of the image and the focal length fy in the vertical direction (fpy) are corrected in accordance with the lens temperature. However, the correction target may be one of the focal lengths. In general, in a case where the camera and the projector are arranged in the horizontal direction, and also only the spatial code pattern in one direction is projected, the projector projects the spatial code pattern in the vertical direction to perform the three-dimensional measurement at a high accuracy. In the above-described case, the shift in the vertical direction (orthogonal direction) of the pattern in the picked-up image or the stripe pattern projected by the projector affects the accuracy of the three-dimensional measurement less than the shift in the horizontal direction. For that reason, only the focal length fx in the horizontal direction (fpx) of the image may be corrected in accordance with the lens temperature. For the same reason, in a case where the camera and the projector are arranged in the vertical direction, only the focal length fy in the vertical direction (fpy) of the image may be corrected. In addition, also when the relationship between the temperature and the correction target calibration parameters for the correction is obtained, only the shift in the horizontal or vertical direction may be considered. With this configuration, even in a case where hysteresis exists in the shift in the direction which does not affect the accuracy, it is possible to avoid the problem that the calibration accuracy of the relationship between the temperature and the correction target calibration parameters is decreased.

According to the above-described exemplary embodiment, the focal lengths are corrected as the correction target calibration parameters in accordance with the lens temperature. However, the correction target calibration parameters may be parameters other than the focal lengths. For example, in a case where translation is also caused by the temperature change of the lens in addition to the expansion or contraction, the position of the image center may also be corrected. When the translation from the reference position at the temperature T is set as $(\Delta u(T), \Delta v(T))$, Expression 1 is represented as Expression 7.

$$u_i(T)=u_i(T_{refc})+k(T)(u_i(T_{refc})-c_x)+\Delta u(T)$$

$$v_i(T)=v_i(T_{refc})+k(T)(v_i(T_{refc})-c_y)+\Delta v(T) \quad (7)$$

Similarly as in step S1310 according to the first exemplary embodiment, $k(T)$, $\Delta u(T)$, and $\Delta v(T)$ are calculated by the least square method. Furthermore, the relationship between the temperature and $k(T)$, $\Delta u(T)$, and $\Delta v(T)$ is calculated by obtaining the regression line for each of $k(T)$, $\Delta u(T)$, and $\Delta v(T)$ calculated at the respective temperatures. Expression 8 is derived in the same manner as the derivation of Expression 3 from Expression 1 and Expression 2.

$$u_i(T)=(1+k(T))f_{xref}x_i+c_x+\Delta u(T)$$

$$v_i(T)=(1+k(T))f_{yref}y_i+c_y+\Delta v(T) \quad (8)$$

The image centers of the camera at the correction reference temperature Trefc are set as cxref (horizontal direction) and cyref (vertical direction). When the regression lines of $\Delta u(T)$ and $\Delta v(T)$ are set as $\Delta u(T)=a_uT+b_u$ and $\Delta v(T)=a_vT+b_v$, the image centers cx(T) (horizontal direction) and cy(T) (vertical direction) at the temperature T are represented as Expression 9.

$$c_x(T)=c_{xref}+(a_uT+b_u)$$

$$c_y(T)=c_{yref}+(a_vT+b_v) \quad (9)$$

When the three-dimensional measurement is performed, the focal lengths and the image centers are corrected as the correction target calibration parameters by using Expression 4 and Expression 9 in accordance with the temperature. It is noted that the focal lengths and the image centers are corrected as the correction target calibration parameters in the present example, but the configuration is not limited to this. For example, in a case where the main factor for the fluctuation caused by the temperature change of the lens is the translation, only the image center position may be corrected.

In addition, if the calibration parameters other than the focal lengths and the image center positions can be represented as the function of the temperature like Expression 4 and Expression 9, the correction in accordance with the temperature may be performed. For example, a parameter of a lens distortion is obtained as the function of the temperature on the basis of the rate of expansion and contraction $k(T)$, and the correction of the lens distortion parameter may be performed when the three-dimensional measurement is performed.

According to the above-described exemplary embodiment, the descriptions have been given in which the correction is performed in accordance with the temperature while the internal parameters of the camera or the projector such as the focal length, the image center position, and the lens distortion parameter are set as the correction target calibration parameters. However, the correction target calibration parameters may be parameters other than the internal parameters. For example, in a case where the rotation in the image plane is caused by the temperature change of the lens, a rotation component about the optical axis may be corrected among external parameters between the camera and the projector. In a case where the image center position is set as the rotation center, when a rotation angle from the reference position on the image at the temperature T is set as $\varphi(T)$, the image coordinates $(u_i(T), v_i(T))$ at the temperature T can be represented as Expression 10. Herein, it is assumed that no translation caused by the temperature change of the lens exists, and furthermore, the rotation amount $\varphi(T)$ is sufficiently small, so that approximations of $\cos \varphi \approx 1$ and $\sin \varphi \approx \varphi$ can be carried out.

$$u_i(T)=u_i(T_{refc})-\varphi(T)(v_i(T_{refc})-c_y)$$

$$v_i(T)=v_i(T_{refc})+\varphi(T)(u_i(T_{refc})-c_x) \quad (10)$$

Similarly as in step S1310 according to the first exemplary embodiment, φ(T) is calculated by the least square method for each temperature. Furthermore, a relationship between the temperature and φ(T) is obtained by calculating the regression line with respect to φ(T) calculated at the respective temperatures. In a case where the image center position is set as the rotation center, the rotation on the image plane of the camera or the projector by φ is equivalent to the rotation of the camera or the projector about the optical axis by φ. For that reason, when the rotation angle φ on the image plane is found, it is possible to correct the external parameter between the camera and the projector. When the three-dimensional measurement is performed, the calculation of the three-dimensional coordinates is performed by using the corrected external parameter. A rotation matrix R of the external parameter between the camera and the projector and a translation vector t are corrected as represented as Expression 11.

$$R = R(\phi_P(T))R(T_{refc})R(\phi_c(T))$$

$$t = R(\phi_P(T))t(T_{refc}) \qquad (11)$$

It is noted that $\varphi_C(T)$ and $\varphi_P(T)$ denote the rotation angles of the camera and the projector at the temperature T which are obtained from the regression line. In addition, $R(\varphi_C(T))$ and $R(\varphi_P(T))$ denote the rotation matrices in the case of rotation about the optical axis by $\varphi_C(T)$ or $\varphi_P(T)$. Furthermore, R(Trefc) and t(Trefc) denote the rotation matrix R of the external parameter between the camera and the projector and the translation vector t which are previously calibrated at the correction reference temperature. In a case where the calculation of the three-dimensional coordinates is performed by using the corrected external parameter, the coordinate system functioning as the reference of the three-dimensional coordinates is changed. Therefore, the three-dimensional coordinates in the unified coordinate system are output by transforming the obtained three-dimensional coordinates into the coordinate system without the correction as the reference. Herein, to simplify the descriptions, the expansion or contraction and the translation caused by the temperature change of the lens do not exist, but in a case where the expansion or contraction and the translation are caused, the focal length and the image center may be corrected in addition to the external parameter.

According to the above-described exemplary embodiment, the three-dimensional measurement apparatus constituted by the single camera and the single projector has been described. However, the three-dimensional measurement apparatus to which the above-described exemplary embodiment is applied is not limited to this configuration. For example, the three-dimensional measurement apparatus may be constituted by a plurality of cameras (a plurality of individual pieces) or constituted by a plurality of cameras and a single projector. Furthermore, the present disclosure may be applied to a position and orientation estimation method by using a single camera instead of the three-dimensional measurement apparatus. For example, when the position and orientation estimation is performed by fitting a 3D model to an image (T. Drummond, R. Cipolla, "Real-time visual tracking of complex structures," IEEE Trans. on Pattern Analysis and Machine Intelligence, vol. 24, no. 7, pp. 932-946, 2002), the correction of the correction target calibration parameters according to the above-described exemplary embodiment is performed, so that it is possible to estimate the position and orientation at a higher accuracy.

In addition, the above-described exemplary embodiment may be applied to a projection apparatus constituted by a plurality of projectors. In this case, a camera is fixed to the projection apparatus, and the focal lengths of the projector are corrected by the method described in the second exemplary embodiment. Furthermore, the images projected by the respective projectors are modified by using the corrected focal lengths, so that it is possible to regularly present the same image even when the projection position of the projector is fluctuated by the temperature change.

According to the above-described exemplary embodiment, the individual piece of the three-dimensional measurement apparatus that calibrates the relationship between the temperature and the correction target calibration parameters is the same as the individual piece of the three-dimensional measurement apparatus that actually performs the three-dimensional measurement. However, the individual piece of the three-dimensional measurement apparatus that is used for the calibration may be different from the individual piece of the three-dimensional measurement apparatus that performs the three-dimensional measurement. For example, in a case where a plurality of three-dimensional measurement apparatuses having the same configuration exist, the regression line may be obtained with respect to a relation between the temperatures obtained for the plurality of individual pieces and the fluctuation parameter. In addition, the relationship between the temperature and the correction target calibration parameters is previously calibrated by using a single individual piece or a plurality of individual pieces, so that the correction target calibration parameters of the other individual pieces that are not used for the calibration may be corrected.

According to the above-described exemplary embodiment, the temperature is measured also at the time of the three-dimensional measurement by using the temperature sensor that has been used for calibrating the relationship between the temperature and the correction target calibration parameters. However, the measurement method for the temperature at a time when the three-dimensional measurement is performed is not limited to this. For example, a relationship between an elapsed time from a time (time point) when the apparatus is activated at the time of the calibration and the temperature change may be recorded, and the temperature may be estimated from the elapsed time when the three-dimensional measurement is performed. With this configuration, it is possible to avoid arranging the temperature sensor in the three-dimensional measurement apparatus, and manufacturing costs and failure rate of the three-dimensional measurement apparatus can be reduced. If a temperature region appearing when the three-dimensional measurement is performed is included, a time set as a reference for the elapsed time can be arbitrarily set. For example, the time may be a time when the apparatus is activated as described above, a time after a predetermined time elapses after the activation time, or a time when the warming-up of the apparatus is completed. In addition, at the time of the calibration, the temperature sensors are arranged on the focus ring of the lens and the substrate of the lens to record a relationship between those temperature sensors, and when the three-dimensional measurement is performed, the temperature of the lens may be estimated from the temperature sensor on the substrate side by removing the temperature sensor on the focus ring side. With this configuration, it is possible to increase the degree of freedom for arranging the temperature sensors at the time of the calibration.

According to the above-described exemplary embodiment, the three-dimensional measurement apparatus constituted by the camera and the projector has been described. However, the corrected calibration parameter may be used for purposes other than the three-dimensional measurement. For example, the corrected calibration parameter may be used as the internal parameter employed in a method of estimating the position and orientation by fitting a 3D model to a range image and a grayscale image (Tateno, Kotake, and Uchiyama, "A Model Fitting Method Using Intensity and Range Images for Bin-Picking Applications", The Transactions of the Institute of Electronics, Information and Communication Engineers of Japan (D), vol. J94-D, no. 8, pp. 1410-1422, 2011). With this configuration, not only the accuracy of the range image corresponding to the result of the three-dimensional measurement but also an accuracy for a position and orientation calculation unit to calculate the position and orientation can be improved. Alternatively, the corrected calibration parameter can be used in the method of estimating the position and orientation by using only either the range image or the grayscale image.

Definition

A calibration parameter holding unit according to the above-described exemplary embodiment holds the internal parameters (the focal lengths, the image centers, and the lens distortion parameters) of the camera and the projector corresponding to the parameters used for the three-dimensional measurement and the relative position and orientation between the camera and the projector. In addition, in a case where a plurality of cameras exist, the relative position and orientation between the cameras may be held. Furthermore, in a case where a plurality of projectors exist, the relative position and orientation between the projectors may be held.

A temperature correction parameter holding unit according to the above-described exemplary embodiment holds the relationship between the temperature of the lens of the camera or the projector and the correction target calibration parameters. The correction target calibration parameters may be the focal lengths of the camera or the projector, the image centers, or the lens distortion parameters. In addition, the relationship between the temperature of the lens and the correction target calibration parameters may be held as the linear function or held as an arbitrary function if the correction target calibration parameters can be decided on the basis of the temperature. Moreover, the lens may be a single lens or a product including a plurality of lenses and exterior parts.

The pattern projection unit according to the above-described exemplary embodiment projects the illumination pattern for the three-dimensional measurement. The pattern projection unit may project the pattern by switching a plurality of illumination patterns such as the spatial coding pattern and the pattern form the phase shift method or may project a single illumination pattern.

The temperature measurement unit according to the above-described exemplary embodiment measures a temperature at a site where a dependence relationship between the temperature at the relevant site and the correction target parameter exists. The temperature measurement unit is a temperature sensor and is realized, for example, by a thermistor. The position where the temperature sensor is arranged is the focus ring or mount of the lens. When the three-dimensional measurement is performed, a temperature of the lens may be directly measured. A temperature of a part other than the lens such as the substrate of the lens and the temperature of the lens may be measured at the time of the calibration, and when the three-dimensional measurement is performed, the temperature of the substrate may be measured to be converted into the temperature of the lens. Moreover, the temperature is not measured when the three-dimensional measurement is performed, and the temperature may be estimated from the relationship between the activation time and the temperature change.

The calibration parameter corrected by the calibration parameter correction unit according to the above-described exemplary embodiment may be utilized not only for the calculation of the three-dimensional coordinates but also for the position and orientation estimation in which both the three-dimensional coordinates and the image information are used in combination. In addition, the calibration parameter may be utilized for the adjustment of the projected image in the projection apparatus constituted by the plurality of projectors.

A temperature correction parameter calculation unit according to the above-described exemplary embodiment calculates correction parameters on the basis of images at different temperatures of the calibration object arranged in the predetermined position with respect to the three-dimensional measurement apparatus. The calculation of the correction parameters may be performed by using only an individual piece of the calibration target or using information of a plurality of individual pieces.

The corrected calibration parameters according to the above-described exemplary embodiment may be the focal lengths of the camera or the projector, the image centers, or the lens distortion parameter. In addition, the calibration parameters corrected may be limited in accordance with the direction of the projected pattern. According to the present disclosure, the pattern projected from the projector may be the spatial coding pattern, a pattern constituted by a plurality of illumination patterns like the pattern for the phase shift method, or a single illumination pattern.

The three-dimensional coordinate calculation unit according to the above-described exemplary embodiment obtains the three-dimensional coordinates as the intersecting point of the straight line passing through the point on the picked-up image and the lens center of the camera (hereinafter, referred to as line-of-sight vector) and the plane passing through the lens center of the projector and the vertical (horizontal) line. In addition to the above, the three-dimensional coordinates may be obtained on the basis of the coordinates of a point on the picked-up image or the coordinates on the projection pattern by the least square method.

Third Exemplary Embodiment

According to the first exemplary embodiment and the second exemplary embodiment, the example in which the calibration parameters are decided in accordance with the temperature has been described. According to a third exemplary embodiment, an example in which a variation of the image coordinates of the projector and the camera changed in accordance with the temperature is corrected will be described.

FIG. 10 illustrates a configuration of an information processing apparatus 2 connected to a three-dimensional measurement apparatus according to the present exemplary embodiment. The information processing apparatus 2 is constituted by the image input unit 115, the temperature input unit 135, the temperature correction parameter saving unit 150, the calibration parameter saving unit 160, an image coordinate decision unit 270, the image processing unit 180, and the three-dimensional coordinate calculation unit 190.

The image pickup unit 110, the pattern projection unit 120, the temperature measurement unit 130, and the control unit 140 are connected to the information processing apparatus 2.

The image input unit 115, the temperature input unit 135, the calibration parameter saving unit 160, the image processing unit 180, and the three-dimensional coordinate calculation unit 190 are the same as the contents described in the first exemplary embodiment, and the descriptions thereof will be omitted. In addition, the image pickup unit 110, the pattern projection unit 120, the temperature measurement unit 130, and the control unit 140 are also the same as the contents described in the first exemplary embodiment, and the descriptions thereof will be omitted.

The temperature correction parameter saving unit 150 saves information obtained by parameterizing a relationship between a temperature of the camera lens and a correction amount of the image coordinates of each of the camera and the projector. According to the present exemplary embodiment, the variation of the image coordinates is decomposed into three components including a translation component, a scaling component, and a rotation component, and the temperature correction parameter is obtained for each of the components. Details of the procedure for calculating this temperature correction parameter will be described below.

The image coordinate decision unit 270 corrects the camera image coordinate values (uc, vc) corresponding to the boundary coordinate values of the spatial code in the picked-up image calculated by the image processing unit 180 and the projector image coordinate values (up, vp) corresponding to the values of the spatial code. It is possible to obtain both of the projector image coordinate values (up, up) as the projector image coordinate values by projecting the spatial coding patterns in the horizontal direction and the vertical direction. Alternatively, even when only the spatial coding pattern in either the horizontal direction or the vertical direction is projected, the other projector image coordinate value can be obtained by using epipolar geometry. The correction is carried out on the basis of the temperature of the camera lens at the time of the image pickup which is measured by the temperature measurement unit 130 and the temperature correction parameters held by the temperature correction parameter saving unit 150. Details thereof will be described below.

Next, descriptions will be given of a procedure for parameterizing the variation of the image coordinates caused by the temperature change into temperature correction parameters, which is carried out before the three-dimensional measurement is performed. It is assumed that, before the temperature correction parameters are obtained, the calibration of the calibration parameters is ended by the procedure illustrated in FIG. 4. To obtain the temperature correction parameters, the image pickup of the calibration object illustrated in FIG. 3 is to be performed while the temperature is changed. For example, the image pickup can be performed by a method similar to steps S1220 to S1230 in FIG. 6 used in the first exemplary embodiment.

Figure 11A:
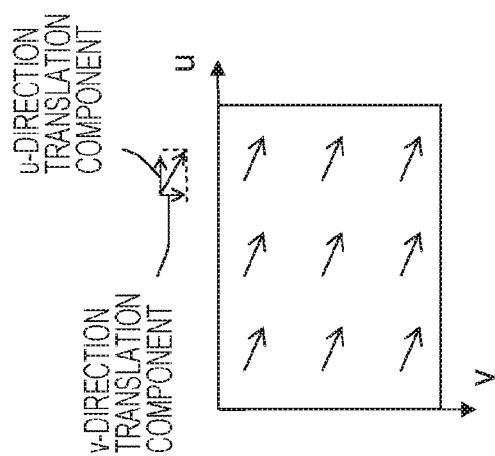
FIGS. 11A to 11E are explanatory diagrams for describing a variation of an image coordinate value.

When the correction amount is parameterized on the basis of the variation of the image coordinates caused by the temperature change, the correction amount is decomposed into the three components including the translation component, the scaling component, and the rotation component to be parameterized. This process will be schematically described by using FIGS. 11A to 11E. FIG. 11A represents the variations of the image coordinate values between the reference temperature and a particular temperature for each location by way of vectors. It is common in FIGS. 11A to 11E that a length of the vector represents the variation of the image coordinates, and a direction of the vector represents the change direction of the image coordinates. To take particular note of the visibility of the drawings, the vectors are illustrated to be longer than the actual variation on the image coordinates.

Figure 11B:
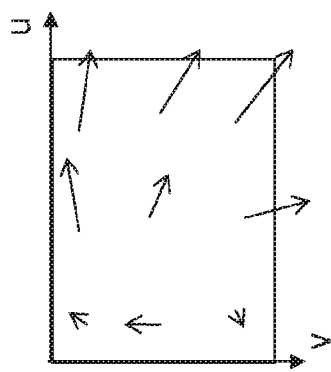

FIG. 11B illustrates the translation component extracted from FIG. 11A. The translation component is constituted by two components including an x-direction translation component and a y-direction translation component. The translation component is extracted by obtaining the variation in the image center which is included in the calibration parameter.

Figure 11E:
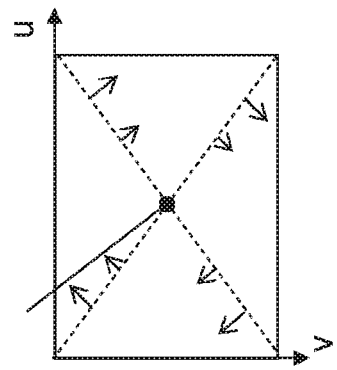
Figure 11D:
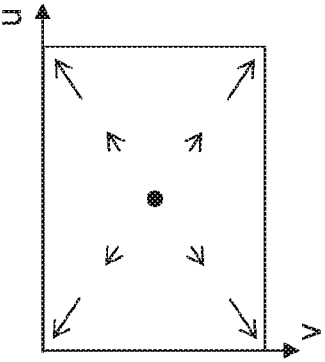
Figure 11C:
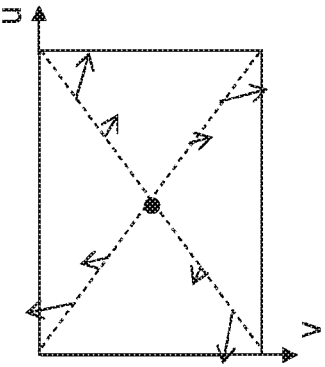

FIG. 11C illustrates a result of subtracting a movement amount of the translation component illustrated in FIG. 11B from the variation of the image coordinate values illustrated in FIG. 11A.

FIG. 11D illustrates the scaling component extracted from FIG. 11C. The scaling component is parameterized such that the variation is increased in proportion to a distance from the image center. In addition, the changing direction is set as a radial direction. The radial direction is a direction parallel to the vector connecting the image center to the respective image coordinates.

FIG. 11E illustrates the rotation component extracted from FIG. 11C. The rotation component is parameterized such that the variation is increased in proportion to the distance from the image center. The rotation component is different from the scaling component, and the changing direction is a tangent direction. The tangent direction is a direction perpendicular to the vector connecting the image center to the respective image coordinates.

Figure 12:
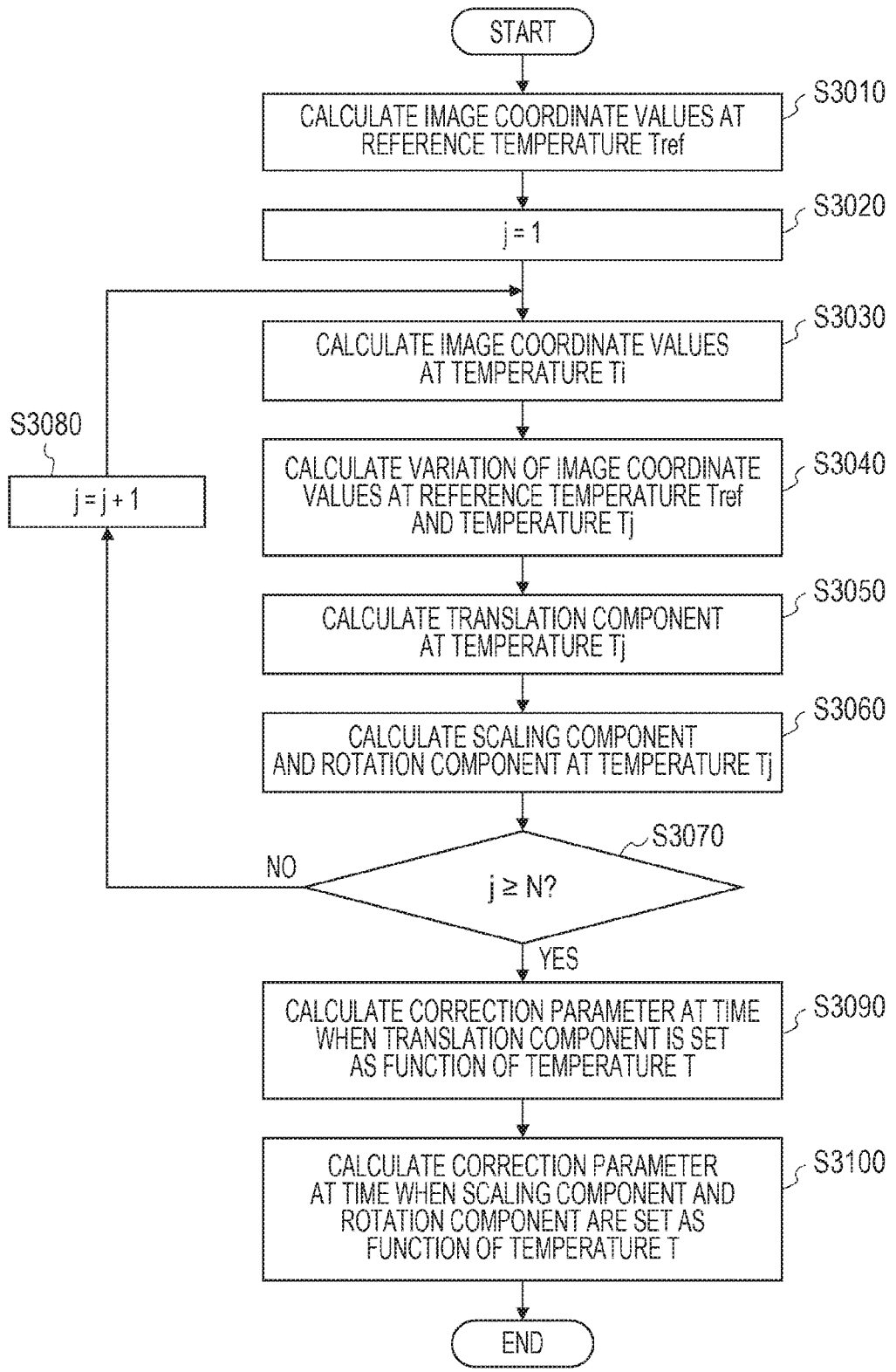
FIG. 12 is a flow chart illustrating a procedure of calculating a temperature correction parameter according to the third exemplary embodiment.

FIG. 12 is a flow chart of a procedure for calculating the temperature correction parameters. The number of times when the image group is obtained in step S1220 in FIG. 6 is N.

Step S3010

In step S3010, the camera image coordinate values of the circular marker of the calibration object are calculated on the basis of the picked-up image in the correction reference temperature. Furthermore, the projector image coordinate values of the circular marker are calculated on the basis of the image group onto which the spatial coding pattern is projected. The image coordinate values at the correction reference temperature Trefc are set as (ui(Trefc), vi(Trefc)).

Step S3020

In step S3020, a count number j is set as 1.

Step S3030

In step S3030, the camera image coordinate values of the circular marker of the calibration object and the projector image coordinate values are calculated on the basis of the picked-up image group at the temperature Tj. The image coordinate values at the temperature Tj are set as (ui(Tj), vi(Tj)).

Step S3040

In step S3040, a difference between the image coordinate values (ui(Trefc), vi(Trefc)) of the circular marker of the calibration object at the reference temperature Trefc and the image coordinate values (ui(Tj), vi(Tj)) of the circular marker of the calibration object at the temperature Tj is calculated. With regard to the difference, a difference of the image coordinate values of the circular markers position in the same world coordinates is calculated by the following Expression 12.

$$\Delta u_i(T_j) = u_i(T_j) - u_i(T_{refc})$$

$$\Delta v_i(T_j) = v_i(T_j) - v_i(T_{refc}) \qquad (12)$$

A value of this difference is the variation of the image coordinate values between the reference temperature Trefc and the temperature Tj. The value is equivalent to the variation illustrated in FIG. 11A.

Step S3050

In step S3050, the translation component of the variation of the marker image coordinates at the temperature Tj is calculated. As described above, the variations of the translation components of the image coordinates are equivalent to the variations (Δucxcy(Tj), Δvcxcy(Tj)) at the image centers (cx, cy). In a case where the marker does not exists in the same position as the image center positions, the variations of the image center positions (cx, cy) may be calculated by using linear interpolation or the like from variations of surrounding markers. When the translation component in the u direction is set as Δut(Tj), and the translation component in the v direction is set as Δvt(Tj), the variations are represented as Expression 13.

$$\Delta u_t(T_j) = \Delta u_{cxcy}(T_j)$$

$$\Delta v_t(T_j) = \Delta v_{cxcy}(T_j) \qquad (13)$$

Step S3060

In step S3060, the scaling component and the rotation component of the variation of the marker image coordinates at the temperature Tj are calculated. The variations of the scaling component and the rotation component of the image coordinates as described in FIGS. 11A to 11E are calculated on the basis of variations (Δucti(Tj), Δvcti(Tj)) obtained by subtracting the translation component from the variation of the image coordinates calculated in S3040 (Expression 14).

$$\Delta u_{cti}(T_j) = \Delta u_i(T_j) - \Delta u_t(T_j)$$

$$\Delta v_{cti}(T_j) = \Delta v_i(T_j) - \Delta v_t(T_j) \qquad (14)$$

A distance ruvi(Tj) from the image coordinates (ui(Tj), vi(Tj)) to the image centers (cx, cy) is calculated by the following Expression 15.

$$r_{uvi}(T_j) = \sqrt{(u_i(T_j) - c_x)^2 + (v_i(T_j) - c_y)^2} \qquad (15)$$

Lengths of the variation vectors (Δucti(Tj), Δvcti(Tj)) obtained by subtracting the translation components from the variations of the image coordinates is calculated by the following Expression 16.

$$r_{difi}(T_j) = \sqrt{(\Delta u_{cti}(T_j))^2 + (\Delta v_{cti}(T_j))^2} \qquad (16)$$

An angle φi defined by the radial direction and the variation vector obtained by subtracting the translation component is calculated by the following Expression 17.

$$\phi_i(T_j) = \cos^{-1}\left(r_{uvi}(T_j)\frac{(u_i(T_j)-c_x)(\Delta v_{cti}(T_j)) - (v_i(T_j)-c_y)(\Delta u_{cti}(T_j))}{(u_i(T_j)-c_x)(\Delta u_{cti}(T_j)) + (v_i(T_j)-c_y)(\Delta v_{cti}(T_j))}\right) \qquad (17)$$

A scaling movement amount rpowi in the image coordinate positions (ui, vi) is calculated by the following Expression 18.

$$r_{powi} = r_{difi}(T_j)\cos(\phi_i(T_j)) \qquad (18)$$

Since ruv corresponding to the distance from the image center and the scaling movement amount rpow are supposed to have a linear relationship, it is possible to calculate the rotation component ΔPow(Tj) at the temperature Tj on the basis of ruvi and rpowi of all the markers from a slope of an approximate straight line of the following Expression 19.

$$r_{pow} = r_{uv}\Delta Pow(T_j) \qquad (19)$$

A rotation movement amount rroti in the image coordinate positions (ui, vi) is calculated by the following Expression 20.

$$r_{roti} = r_{difi}(T_j)\sin(\phi_i(T_j)) \qquad (20)$$

Since ruv corresponding to the distance from the image center and the rotation movement amount rrot are supposed to have a linear relationship, it is possible to calculate the rotation component ΔRot(Tj) at the temperature Tj on the basis of ruvi and rroti of all the markers from a slope of an approximate straight line of the following Expression 21.

$$t_{rot} = r_{uv}\Delta Rot(T_j) \qquad (21)$$

Step S3070

In step S3070, it is determined whether or not the calculation for all the temperatures is ended. Specifically, it is determined whether or not the count number j is higher than or equal to N. In the case of No, the flow advances to step S3080. In the case of Yes, the flow advances to step S3090.

Step S3080

In step S3080, 1 is added to the count number j. When the addition is ended, the flow advances to step S3030.

Step S3090

In step S3090, correction parameters at a time when the translation components Δut(T) and Δvt(T) are set as the function of the temperature T are calculated. The estimation of the regression lines of the translation components Δut(T) and Δvt(T) obtained in step S3050 and the temperature T is performed. The regression lines are represented by Δut(T)= βtx'+αtx'·T and Δv$_t$(T)=βty'+αty'·T. When the estimation of the regression lines is performed, Δut(T) and Δvt(T) are set to be 0 in a case where the temperature is at Tref.

Since the thus obtained βtx', αtx', βty', and αty' are the parameters for obtaining the variation of the image coordinate values in accordance with the temperature, and the signs of the variation are to be inverted to set these parameters as the parameters for performing the correction.

That is, by inverting the signs like βtx=-βtx', αtx=-αtx', βty=-βty', and αty=-αty', the correction parameters are obtained.

Step S3100

In step S3100, correction parameters at a time when the scaling component ΔPow(T) and the rotation component ΔRot(T) are set as the function of the temperature T are calculated. The estimation of the regression line of the scaling component ΔPow(T) and the rotation component ΔRot(T) obtained in step S3060 and the temperature T is performed. The regression lines are represented as ΔPow (T)=βp'+αp'·T and ΔRot(T)=βr'+αr'·T. When the estimation of the regression line is performed, ΔPow(T) and ΔRot(T) are set to be 0 in a case where the temperature is at Tref.

Since the thus obtained βp', αp', βr', and αr' are the parameters for obtaining the variation of the image coordinate values in accordance with the temperature, and the signs of the variation are to be inverted to set these parameters as the parameters for performing the correction.

That is, by inverting the signs like βp=-βp', αp=-αp', βr=-βr', and αr=-αr', the correction parameters are obtained.

The procedure for calculating the temperature correction parameters has been described above.

Figure 13:
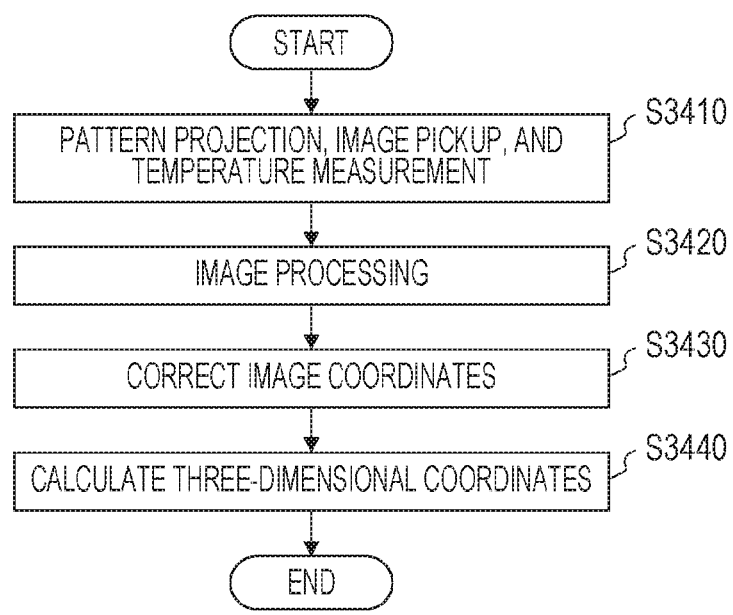
FIG. 13 is a flow chart illustrating a processing procedure of a three-dimensional measurement according to the third exemplary embodiment.

Next, a method of performing the three-dimensional measurement while the image coordinates are corrected in accordance with the temperature will be described. FIG. 13 is a flow chart illustrating a processing procedure of the three-dimensional measurement according to the present exemplary embodiment.

Step S3410

In step S3410, an image of the measurement target object onto which the spatial coding pattern (gray code pattern) is projected by the pattern projection unit 120 is picked up by the image pickup unit 110. Since the details are described in step S1410 according to the first exemplary embodiment, the descriptions thereof will be omitted. In addition, the measurement of the temperature of the camera lens is performed by the temperature measurement unit 130 at the time of the image pickup.

Step S3420

In step S3420, a set of correspondences between the image coordinates on the picked-up image and the horizontal coordinate on the projection pattern is obtained on the basis of the image obtained by the image pickup in step S3410. Since the specific method is the same as the calculation method for the boundary of the spatial code described in step S1140 according to the first exemplary embodiment, the descriptions thereof will be omitted.

Step S3430

In step S3430, the image coordinate values of the camera and the projector are corrected on the basis of the temperature T of the camera lens and the projector lens measured in step S3410 and the temperature correction parameters stored in the temperature correction parameter saving unit 150. The processing is the same for the camera and the projector. When input values of the image coordinate values of the camera or the projector are set as (uin, vin), the image coordinate values (uout, vout) after the correction are represented as the following Expression 22.

$$u_{out}=u_{in}+\Delta u_t(T)+\Delta u_p(T,u_{in},v_{in})+\Delta u_r(T,u_{in},v_{in})$$

$$v_{out}=v_{in}+\Delta v_t(T)+\Delta v_p(T,u_{in},v_{in})+\Delta v_r(T,u_{in},v_{in}) \quad (22)$$

Δut(T) and Δvt(T) respectively denote the translation component correction amounts in the x direction and the y direction. Δup(T) and Δvp(T) respectively denote the scaling component correction amounts in the x direction and the y direction. Δur(T) and Δvr(T) respectively denote the rotation component correction amounts in the x direction and the y direction.

The translation component correction is carried out on the basis of the following Expression 23. The translation component correction amounts depend on only the temperature correction parameters αtx, αty, βtx, and βty and the temperature T and are therefore the constant amounts across the image.

$$\Delta u_r(T)=\beta_{tx}+\alpha_{tx}T$$

$$\Delta v_r(T)=\beta_{ty}+\alpha_{ty}T \quad (23)$$

The scaling component correction is carried out on the basis of the following Expression 24. The scaling component correction amounts depend on the temperature T and the input image coordinate values (uin, vin). Specifically, the image coordinates are corrected in the radial direction in accordance with the distance from the image center and the input image coordinate values (uin, vin).

$$\Delta u_P(T,u_{in},v_{in})=r_{uv}(\beta_P+\alpha_P T)\cos\phi$$

$$\Delta v_P(T,u_{in},v_{in})=r_{uv}(\beta_P+\alpha_P T)\sin\phi \quad (24)$$

Where ruv denotes a distance between the input image coordinates (uin, vin) and the image centers (cx, cy), and cos φ and sin φ are calculated by the following Expression 25.

$$r_{uv}=\sqrt{(u_{in}-c_x)^2+(y_{in}-c_y)^2}, \quad (25)$$

$$\cos\phi=\left(\frac{u_{in}-c_x}{r_{uv}}\right), \sin\phi=\left(\frac{y_{in}-c_y}{r_{uv}}\right)$$

The rotation component correction is carried out on the basis of the following Expression 26. The rotation component correction amounts depend on the temperature T and the input image coordinate values (uin, vin). Specifically, the image coordinates are corrected in the tangent direction in accordance with the distance from the image center and the input image coordinate values (uin, vin).

$$\Delta u_r(T,u_{in},v_{in})=-r_{uv}(\beta_r+\alpha_r T)\sin\phi$$

$$\Delta v_r(T,u_{in},v_{in})=r_{uv}(\beta_r+\alpha_r T)\cos\phi \quad (26)$$

r, cos φ, and sin φ are calculated by Expression 25.

Step S3440

In step S3440, the three-dimensional coordinates on the surface of the measurement target object are calculated with respect to each of the correspondences obtained in step S3420. The calculation of the three-dimensional coordinates is performed by using the image coordinate values (uout, vout) corrected in step S3430 and the calibration parameters saved in the calibration parameter saving unit 160. The calculation method for the three-dimensional coordinates has been described above, and the descriptions thereof will be omitted.

As described above, according to the present exemplary embodiment, the descriptions have been given of the method in which the relationship between the temperature of the camera lens and the variation of the image coordinates is previously obtained, and the correction of the image coordinate values is performed on the basis of the temperature of the camera lens measured by the temperature sensor when the three-dimensional measurement is performed. Accordingly, even when the position on the picked-up image of the picked-up point is shifted by the temperature change of the outside air temperature or the internal temperature of the device, it is possible to perform the three-dimensional measurement at a high accuracy.

According to the present exemplary embodiment, the descriptions have been given of the example in which the image coordinates of both the camera and the projector are corrected, but the accuracy is improved even by the correction of only one of those image coordinates. In addition, the descriptions have been given of the example in which all of the four components including the translation component in the u direction, the translation component in the v direction, the scaling component, and the rotation component are corrected as the correction components, but the accuracy is improved even by the correction of at least one of those components.

According to the present exemplary embodiment, the example in which the image coordinate values are corrected has been introduced, but a method of correcting the image itself is also conceivable. In the case of the camera correction, the image picked up by the camera is modified on the basis of the correction parameters. In the case of the projector, the projected image is modified on the basis of the correction parameters.

As described above, the relationship between the lens temperature of the camera or the projector and the correction target information is previously calibrated, and the correction target information is corrected, so that it is possible to perform the three-dimensional measurement at a high accuracy even when the temperature change exists.

That is, even when the position on the picked-up image of the picked-up point is shifted by the temperature change of the outside air temperature or the internal temperature of the device, it is possible to perform the three-dimensional measurement at a high accuracy.

In addition, even when the position of the point projected by the projector is shifted by the temperature change of the outside air temperature or the internal temperature of the device, it is possible to perform the three-dimensional measurement at a high accuracy.

Other Embodiments

Embodiments of the present invention can also be realized by a computer of a system or apparatus that reads out and executes computer executable instructions recorded on a storage medium (e.g., a non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to realize the high-accuracy three-dimensional measurement by performing the appropriate calibration in accordance with the various temperature changes.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus that corrects image coordinates of a projection apparatus configured to project a pattern onto a measurement target object to perform a three-dimensional measurement, the information processing apparatus comprising:
one or more processors, and the one or more processors function as following units:
a decomposition unit configured to decompose respective variations of image coordinates in a plurality of images captured at different temperatures into parameters representing magnitudes of a plurality of predetermined movement components;
a calculation unit configured to calculate respective correction parameters for the decomposed parameters expressed in the plurality of predetermined movement components;
a derivation unit configured to derive, for each of the decomposed parameters expressed in the plurality of predetermined movement components, a relationship in which the correction parameter is set as a temperature function based on combinations of correction parameters and temperatures in capturing the plurality of images;
a temperature input unit configured to input a temperature of the projection apparatus;
a determination unit configured to determine respective correction parameters expressed in the plurality of predetermined movement components based on the input temperature of the projection apparatus and the derived relationship; and
a correction unit configured to correct the image coordinates of the projection apparatus based on the determined respective correction parameters expressed in the plurality of predetermined movement components.

2. The information processing apparatus according to claim 1, wherein the predetermined movement components include a translation component.

3. The information processing apparatus according to claim 1, wherein the predetermined movement components include a scaling component.

4. The information processing apparatus according to claim 1, wherein the predetermined movement components include a rotation component.

5. The information processing apparatus according to claim 1, wherein the one or more processors further function as:
an image input unit configured to input an image obtained by capturing the measurement target object onto which the pattern is projected by the projection apparatus;
a detection unit configured to detect a pattern from the input image; and
a coordinate calculation unit configured to calculate a three dimensional coordinate on a surface of the measurement target object based on an association between the detected pattern and the projected pattern and the corrected image coordinates.

6. An information processing apparatus that corrects image coordinates of an imaging apparatus configured to capture an image of a measurement target object to perform a three-dimensional measurement, the information processing apparatus comprising:
one or more processors, and the one or more processors function as following units:
a decomposition unit configured to decompose respective variations of image coordinates in a plurality of images captured at different temperatures into parameters representing magnitudes of a plurality of predetermined movement components;
a calculation unit configured to calculate respective correction parameters for the decomposed parameters expressed in the plurality of predetermined movement components;
a derivation unit configured to derive, for each of the decomposed parameters expressed in the plurality of predetermined movement components, a relationship in which the correction parameter is set as a temperature function based on combinations of correction parameters and temperatures in capturing the plurality of images;
a temperature input unit configured to input a temperature of the imaging apparatus;
a determination unit configured to determine respective correction parameters expressed in the plurality of predetermined movement components based on the input temperature of the imaging apparatus and the derived relationship; and a correction unit configured to correct the image coordinates of the imaging apparatus based on the determined respective correction parameters expressed in the plurality of predetermined movement components.

7. The information processing apparatus according to claim 6, wherein the predetermined movement components include a translation component.

8. The information processing apparatus according to claim 6, wherein the predetermined movement components include a scaling component.

9. The information processing apparatus according to claim 6, wherein the predetermined movement components include a rotation component.

10. The information processing apparatus according to claim 6, further comprising:
a projection apparatus configured to project a pattern onto the measurement target object,
wherein the one or more processors further function as:
an image input unit configured to input an image obtained by capturing the measurement target object, onto which the pattern is projected by the projection apparatus, captured by the imaging apparatus;
a detection unit configured to detect a pattern from the input image; and
a coordinate calculation unit configured to calculate a three dimensional coordinate on a surface of the measurement target object based on an association between the detected pattern and the projected pattern and the corrected image coordinates.

11. A method of correcting image coordinates of a projection apparatus configured to project a pattern onto a measurement target object to perform a three-dimensional measurement, the method comprising:
decomposing respective variations of image coordinates in a plurality of images captured at different temperatures into parameters representing magnitudes of a plurality of predetermined movement components;
calculating respective correction parameters for the decomposed parameters expressed in the plurality of predetermined movement components;
deriving, for each of the decomposed parameters expressed in the plurality of predetermined movement components, a relationship in which the correction parameter is set as a temperature function based on combinations of correction parameters and temperatures in capturing the plurality of images;
inputting a temperature of the projection apparatus;
determining respective correction parameters expressed in the plurality of predetermined movement components based on the input temperature of the projection apparatus and the derived relationship; and
correcting the image coordinates of the projection apparatus based on the determined respective correction parameters expressed in the plurality of predetermined movement components.

12. A non-transitory computer readable storage medium storing a computer program for causing a computer to function as respective units of an information processing apparatus that corrects image coordinates of a projection apparatus configured to project a pattern onto a measurement target object to perform a three-dimensional measurement, the information processing apparatus comprising:
one or more processors, and the one or more processors function as following units:
a decomposition unit configured to decompose respective variations of image coordinates in a plurality of images captured at different temperatures into parameters representing magnitudes of a plurality of predetermined movement components;
a calculation unit configured to calculate respective correction parameters for the decomposed parameters expressed in the plurality of predetermined movement components;
a derivation unit configured to derive, for each of the decomposed parameters expressed in the plurality of predetermined movement components, a relationship in which the correction parameter is set as a temperature function based on combinations of correction parameters and temperatures in capturing the plurality of images;
a temperature input unit configured to input a temperature of the projection apparatus;
a determination unit configured to determine respective correction parameters expressed in the plurality of predetermined movement components based on the input temperature of the projection apparatus and the derived relationship; and
a correction unit configured to correct the image coordinates of the projection apparatus based on the determined respective correction parameters expressed in the plurality of predetermined movement components.

13. A method of correcting image coordinates of an imaging apparatus configured to capture an image of a measurement target object to perform a three-dimensional measurement, the method comprising:
decomposing respective variations of image coordinates in a plurality of images captured at different temperatures into parameters representing magnitudes of a plurality of predetermined movement components;
calculating respective correction parameters for the decomposed parameters expressed in the plurality of predetermined movement components;
deriving, for each of the decomposed parameters expressed in the plurality of predetermined movement components, a relationship in which the correction parameter is set as a temperature function based on combinations of correction parameters and temperatures in capturing the plurality of images;
inputting a temperature of the imaging apparatus;
determining respective correction parameters expressed in the plurality of predetermined movement components based on the input temperature of the imaging apparatus and the derived relationship; and
correcting the image coordinates of the imaging apparatus based on the determined respective correction parameters expressed in the plurality of predetermined movement components.

14. A non-transitory computer readable storage medium storing a computer program for causing a computer to function as respective units of an information processing apparatus that corrects image coordinates of an imaging apparatus configured to capture an image of a measurement target object to perform a three-dimensional measurement, the information processing apparatus comprising:
one or more processors, and the one or more processors function as following units:
a decomposition unit configured to decompose respective variations of image coordinates in a plurality of images captured at different temperatures into parameters representing magnitudes of a plurality of predetermined movement components;

a calculation unit configured to calculate respective correction parameters for the decomposed parameters expressed in the plurality of predetermined movement components;

a derivation unit configured to derive, for each of the decomposed parameters expressed in the plurality of predetermined movement components, a relationship in which the correction parameter is set as a temperature function based on combinations of correction parameters and temperatures in capturing the plurality of images;

a temperature input unit configured to input a temperature of the imaging apparatus;

a determination unit configured to determine respective correction parameters expressed in the plurality of predetermined movement components based on the input temperature of the imaging apparatus and the derived relationship; and a correction unit configured to correct the image coordinates of the imaging apparatus based on the determined respective correction parameters expressed in the plurality of predetermined movement components.

* * * * *